(12) United States Patent
Baluja et al.

(10) Patent No.: US 8,423,541 B1
(45) Date of Patent: Apr. 16, 2013

(54) USING SAVED SEARCH RESULTS FOR QUALITY FEEDBACK

(75) Inventors: Shumeet Baluja, Mountain View, CA (US); Michael Frumkin, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 664 days.

(21) Appl. No.: 11/132,362

(22) Filed: May 19, 2005

Related U.S. Application Data

(60) Provisional application No. 60/666,524, filed on Mar. 31, 2005.

(51) Int. Cl.
*G06F 7/00* (2006.01)
*G06F 17/30* (2006.01)

(52) U.S. Cl.
USPC ............................ 707/732; 707/733; 707/734

(58) Field of Classification Search .................. 707/732, 707/733, 734
See application file for complete search history.

(56) References Cited

U.S. PATENT DOCUMENTS

| | | | | |
|---|---|---|---|---|
| 5,220,625 A * | 6/1993 | Hatakeyama et al. | ......... | 715/809 |
| 5,454,105 A * | 9/1995 | Hatakeyama et al. | ............ | 707/2 |
| 5,701,469 A * | 12/1997 | Brandli et al. | ................ | 707/102 |
| 5,713,020 A * | 1/1998 | Reiter et al. | ................... | 707/102 |
| 5,924,090 A * | 7/1999 | Krellenstein | ..................... | 707/5 |
| 5,974,406 A * | 10/1999 | Bisdikian et al. | ................. | 707/1 |
| 6,006,225 A * | 12/1999 | Bowman et al. | .................. | 707/5 |
| 6,078,916 A * | 6/2000 | Culliss | .............................. | 707/5 |
| 6,185,553 B1 * | 2/2001 | Byrd et al. | ........................ | 707/3 |
| 6,285,999 B1 | 9/2001 | Page | ................................. | 707/5 |
| 6,493,702 B1 * | 12/2002 | Adar et al. | ........................ | 707/3 |
| 6,601,061 B1 * | 7/2003 | Holt et al. | ......................... | 707/3 |
| 6,654,742 B1 * | 11/2003 | Kobayashi et al. | ............... | 707/1 |
| 6,963,867 B2 * | 11/2005 | Ford et al. | ........................ | 707/3 |
| 7,054,875 B2 * | 5/2006 | Keith, Jr. | ....................... | 707/101 |
| 7,158,961 B1 | 1/2007 | Charikar | | |
| 7,181,438 B1 * | 2/2007 | Szabo | .............................. | 707/2 |
| 7,734,627 B1 | 6/2010 | Tong | | |
| 2003/0131013 A1 * | 7/2003 | Pope et al. | ..................... | 707/100 |
| 2003/0172075 A1 * | 9/2003 | Reisman | .......................... | 707/10 |
| 2004/0024745 A1 * | 2/2004 | Jeng et al. | ......................... | 707/2 |
| 2004/0093327 A1 * | 5/2004 | Anderson et al. | .................. | 707/3 |
| 2004/0186828 A1 * | 9/2004 | Yadav et al. | ....................... | 707/3 |

OTHER PUBLICATIONS

"Google Toolbar Features", Google, 2002, 4 pages. http://web.archive.org/web/20021202152347/http://toolbar.google.com/button_help.html.

Brin et al., "The Anatomy of a Large-Scale Hypertextual Web Search Engine", 7th International World Wide Web Conference, Computer Networks and ISDN Systems, vol. 30, No. 1-7, pp. 107-117, 1998.

U.S. Appl. No. 10/814,317 entitled "Methods and Systems for Eliminating Duplicate Events" filed Mar. 31, 2004 by Khan et al., 43 pages.

* cited by examiner

*Primary Examiner* — Mariela Reyes
(74) *Attorney, Agent, or Firm* — Harrity & Harrity, LLP

(57) ABSTRACT

A system receives a search query from a user and searches a corpus of documents using the received search query to determine a set of search results. The system provides the set of search results to the user and receives a request from the user to save one or more selected search results of the set of search results. The system saves the selected one or more results in a database in response to the request and uses the saved one or more results as indicators of search result quality for subsequent related searches.

30 Claims, 22 Drawing Sheets

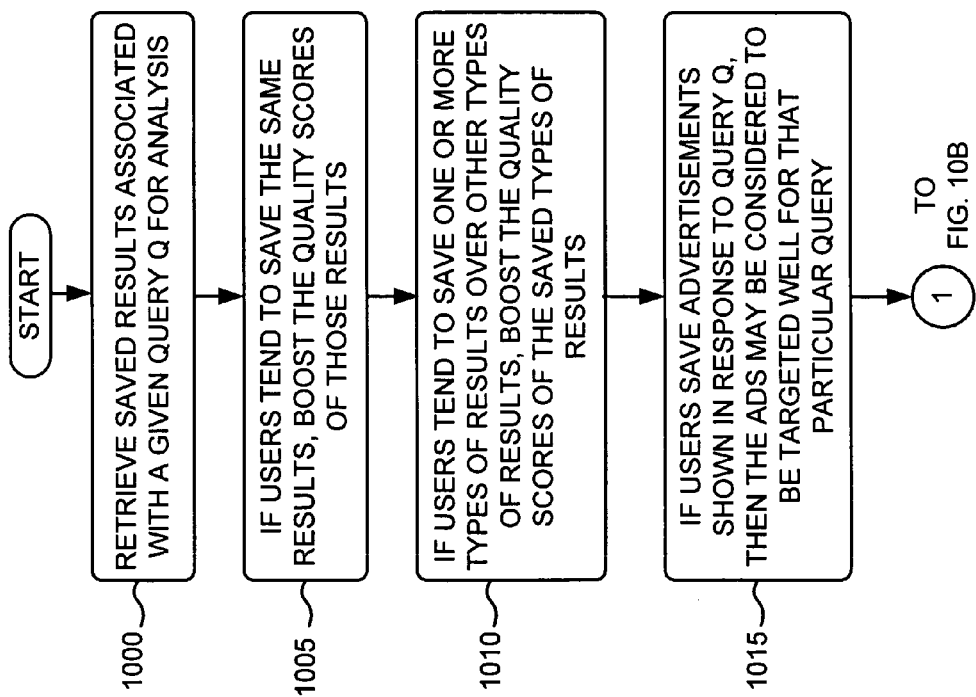

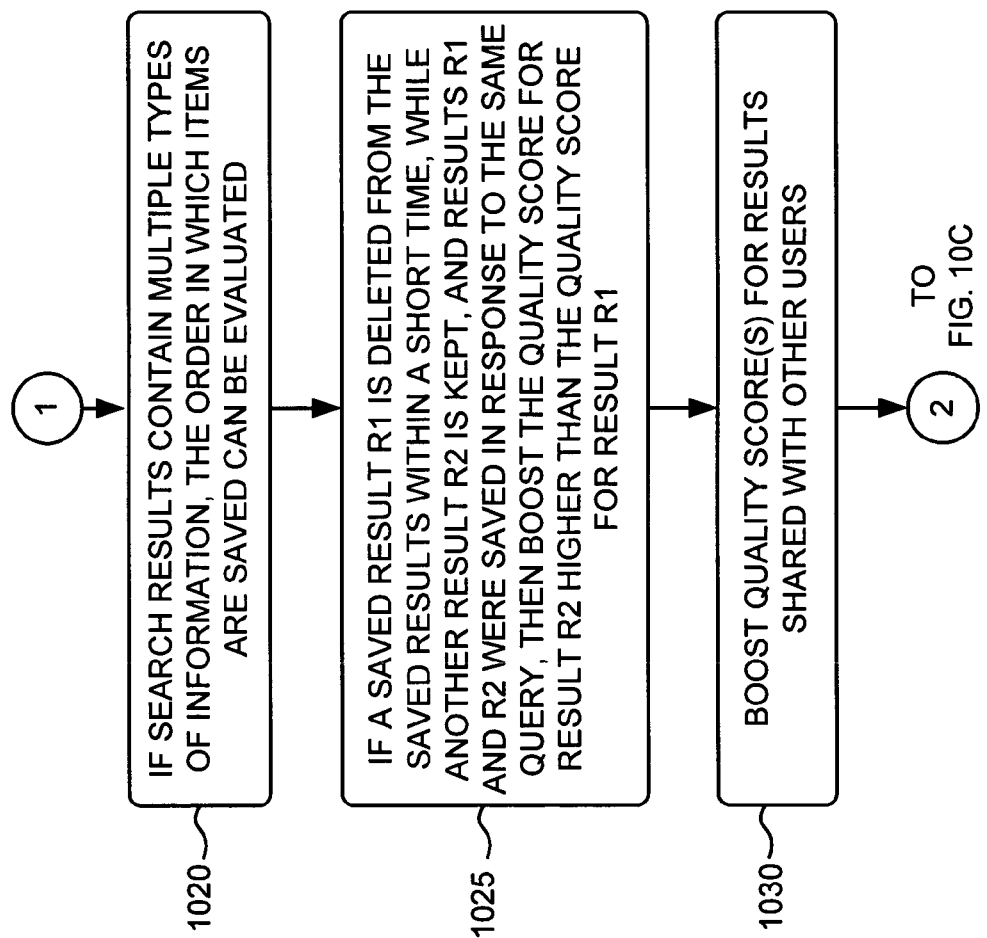

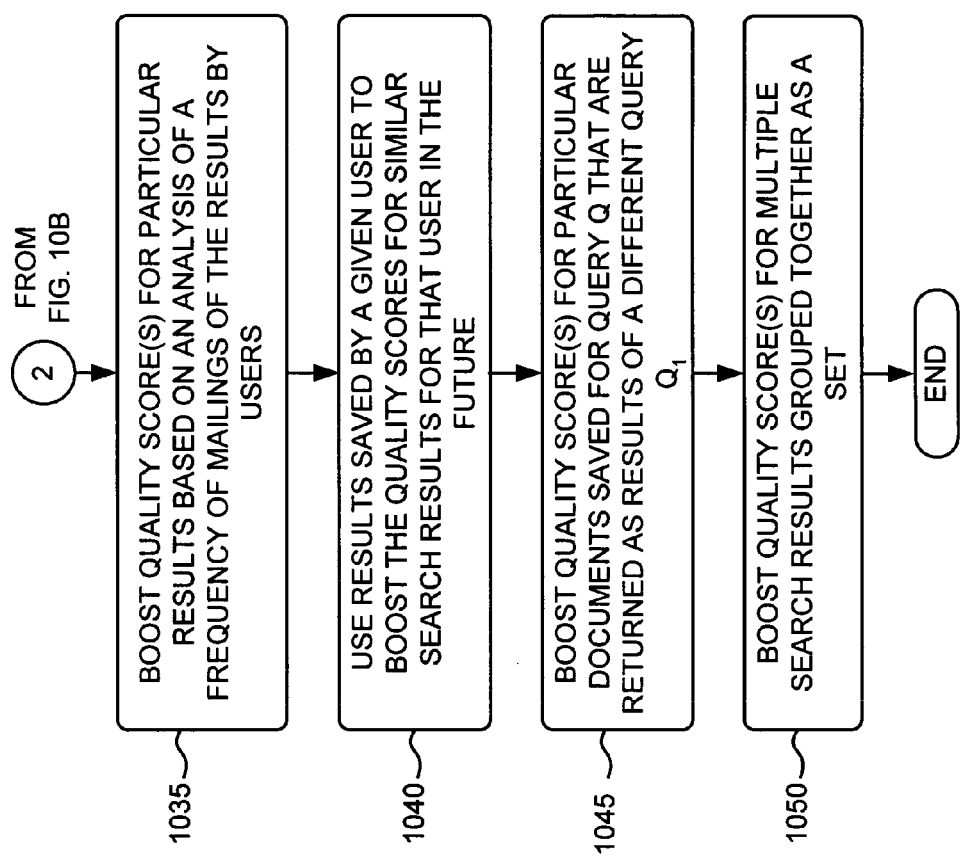

USING SAVED SEARCH RESULTS FOR QUALITY FEEDBACK

CROSS REFERENCE TO RELATED APPLICATION

The instant application claims priority from provisional application No. 60/666,524, filed Mar. 31, 2005, the disclosure of which is incorporated by reference herein in its entirety.

BACKGROUND

1. Field of the Invention

Implementations described herein relate generally to information retrieval and, more particularly, to saving results retrieved as a result of a search for information, and using the saved results to affect quality indicators.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages (e.g., using an index). Web pages that contain the user's search terms are considered "hits" and are returned to the user as links.

SUMMARY

According to one aspect, a method may include receiving a search query from a user and searching a corpus of documents using the received search query to determine a set of search results. The method may further include providing the set of search results to the user and receiving a request from the user to save one or more selected search results of the set of search results. The method may also include saving the selected one or more search results in a database in response to the request and using the saved one or more search results as indicators of search result quality for subsequent related searches.

According to another aspect, a method may include receiving a search query from a user and providing a set of search results to the user based on the search query. The method may further include receiving a request from the user to save one or more selected search results of the set of search results and saving the selected one or more search results in a database in response to the request. The method may also include using the saved one or more search results to ascertain information about the received search query.

According to a further aspect, a method may include searching a corpus of documents using a search query to produce search results and saving one or more of the search results in a data structure in response to a user request. The method may further include using the saved one or more search results to affect quality scores associated with the one or more search results.

According to another aspect, a method may include receiving a selection of search results from a set of search results presented to a user in response to a search query. The method may further include saving the selected search results and using the saved one or more search results as indicators of search result quality for subsequent related searches.

According to yet another aspect, a method may include receiving a search query from a user and determining a ranked list of documents based on the received search query. The method may further include adjusting the ranked list of documents based on previously saved search results relating to the search query and providing the adjusted ranked list of documents to the user.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIGS. 10A-10C are flowcharts of an exemplary process for analyzing search results saved by a server in response to requests from users consistent with implementations of the invention;

DETAILED DESCRIPTION

The following detailed description of the invention refers to the accompanying drawings. The same reference numbers in different drawings may identify the same or similar elements. Also, the following detailed description does not limit the invention.

After a search engine performs a search of information based on a search query, matching or otherwise relevant information may be presented to a user. The matching information may include different types of search results, such as, for example, web page results, image results, product results, advertisements, etc. Consistent with aspects of the invention, a user issuing a search query may select certain search results from a set of search results for storage in a database that is associated with the search engine performing the search. The search results saved by one or more users may be used as implicit indicators of result quality, and to ascertain information about given search queries. Results saved by users may thus be considered to have higher quality (i.e., to be more relevant) than other results. Aggregated statistics regarding the saved search results may be used as a quality signal (e.g., a query-dependent or a query-independent quality signal) in document ranking functions (along with other quality signals, depending on the implementation).

A "document," as the term is used herein, is to be broadly interpreted to include any machine-readable and machine-storable work product. A document may include, for example, an e-mail, a web site, a business listing, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Overview

Figure 1:
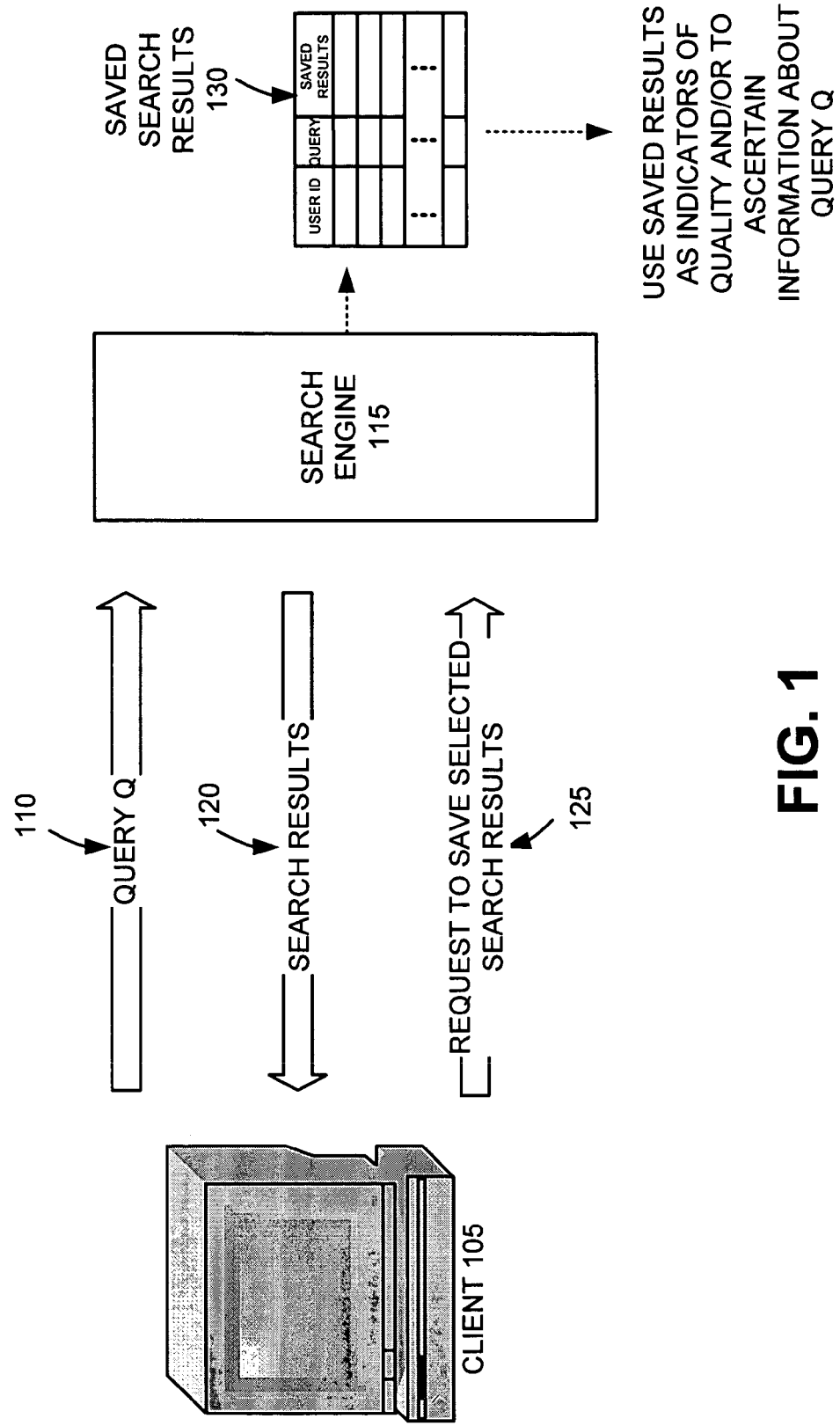
FIG. 1 is an exemplary diagram of an overview of an implementation of the invention in which a user requests that selected results from a search of a corpus of documents be saved by a server that includes a search engine.

FIG. 1 illustrates an exemplary overview of an implementation of the invention in which a user requests that selected results from a search of a corpus of documents be saved, e.g., by a server that includes a search engine. As shown in FIG. 1, a user at a client 105 may issue a query Q 110 to a search engine 115 hosted at a server (not shown). In response to receipt of query Q 110, search engine 115 may perform a search of a corpus of documents, using existing document searching techniques, to identify documents that match or are relevant to query Q 110. Indications (e.g., links) of the identified documents may be provided to client 105 as the results 120 of the search. After receiving search results 120, the user at client 105 may select one or more of the search results as results to be saved by search engine 115. Client 105 may send a request 125 to search engine 115 to save the search results selected by the user. Upon receipt of request 125, search engine 115 may store the selected search results in a data structure associated with search engine 115 as saved search results 130. The user at client 105 may subsequently access (not shown) saved search results 130 via the server hosting search engine 115. Search engine 115 may also subsequently use saved search results 130 as implicit indicators of document quality and/or to ascertain information about query Q 110 issued by the user.

Exemplary Network Configuration

Figure 2:
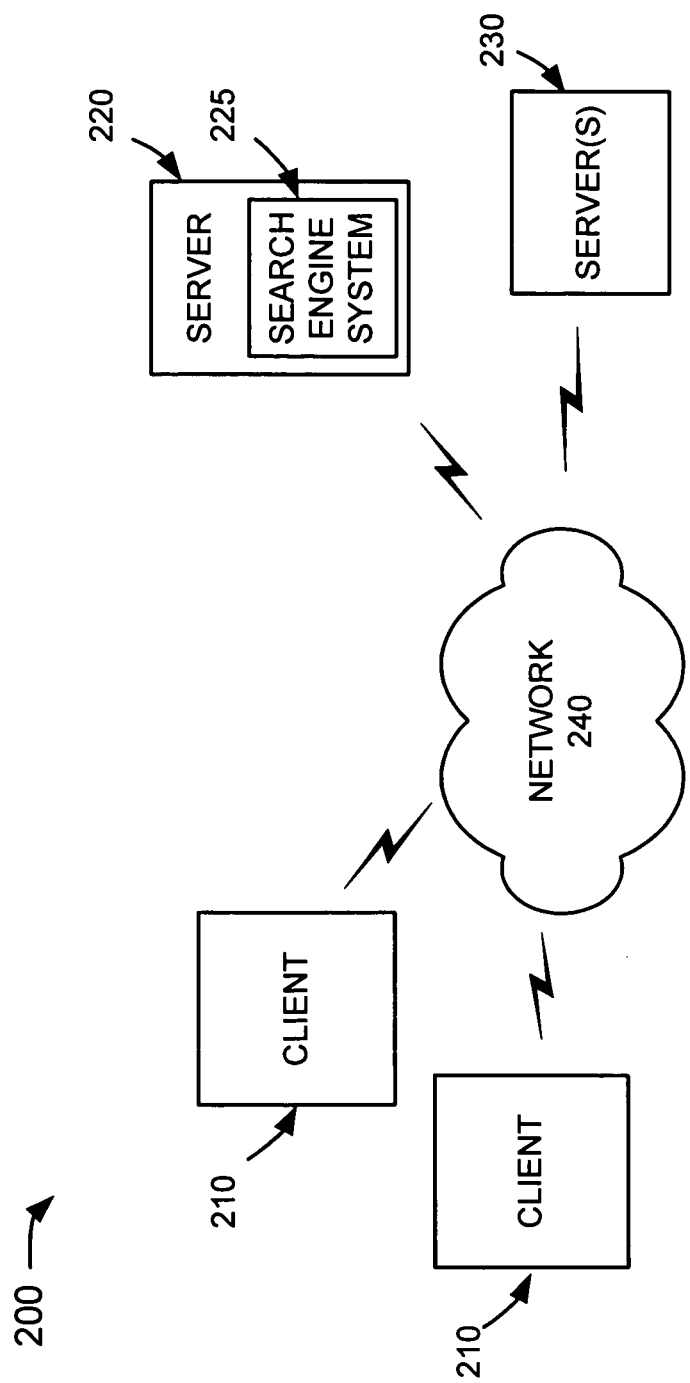
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to one or more servers 220-230 via a network 240. Two clients 210 and two servers 220-230 have been illustrated as connected to network 240 for simplicity. In practice, there may be more or fewer clients and servers. Also, in some instances, a client may perform some functions of a server and a server may perform some functions of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 220 and 230 may include server entities that access, fetch, aggregate, process, search, and/or maintain documents in a manner consistent with the principles of the invention. Clients 210 and servers 220 and 230 may connect to network 240 via wired, wireless, and/or optical connections.

In an implementation consistent with the principles of the invention, server 220 may include a search engine system 225 usable by users at clients 210. Server 120 may implement a data aggregation service by crawling a corpus of documents (e.g., web documents), indexing the documents, and storing information associated with the documents in a repository of documents. The data aggregation service may be implemented in other ways, such as by agreement with the operator(s) of data server(s) 230 to distribute their hosted documents via the data aggregation service. Search engine 125 may execute a query, received from a user at a client 210, on the corpus of documents stored in the repository of documents.

Server(s) 230 may store or maintain documents that may be crawled by server 220. Such documents may include data related to published news stories, products, images, user groups, geographic areas, or any other type of data. For example, server(s) 230 may store or maintain news stories from any type of news source, such as, for example, the Washington Post, the New York Times, Time magazine, or Newsweek. As another example, server(s) 230 may store or maintain data related to specific products, such as product data provided by one or more product manufacturers. As yet another example, server(s) 230 may store or maintain data related to other types of web documents, such as pages of web sites.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), or Mobile IP sub-network.

While servers 220-230 are shown as separate entities, it may be possible for one of servers 220-230 to perform one or more of the functions of the other one of servers 220-230. For example, it may be possible that servers 220 and 230 are implemented as a single server. It may also be possible for a single one of servers 220 and 230 to be implemented as two or more separate (and possibly distributed) devices.

Exemplary Client/Server Architecture

Figure 3:
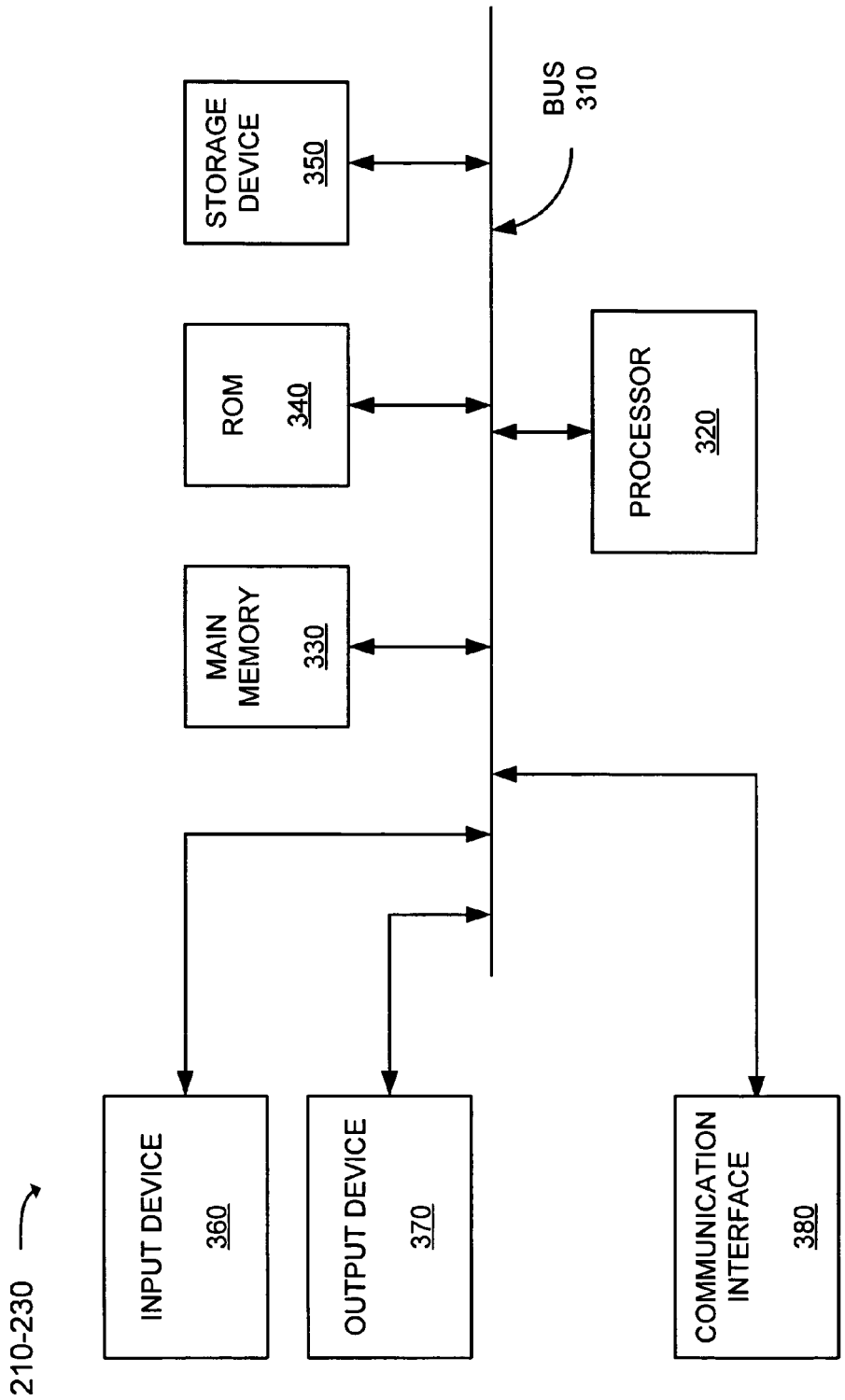
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-230, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that may interpret and execute instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity, consistent with the principles of the invention, may perform certain operations or processes, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform operations or processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Saved Results Data Structure

Figure 4:
FIG. 4 is a diagram of an exemplary data structure for storing search results consistent with an implementation of the invention.

FIG. 4 is an exemplary diagram of a data structure 400 that may be stored in a database (e.g., associated with server 220), and used to store results selected by a user at a client 210. Data structure 400 may include multiple data entries 405, each of which may include an optional user identifier (ID) 410, a query 415, and a set of saved results 420. Optional user identifier 410 may include identification data that uniquely identifies the user, or the client 210, from which the query contained in query 415 originated. Query 415 may include the query issued by the user identified by user ID 410 to search engine system 225. Saved results 420 may include the selected results (e.g., Uniform Resource Locators (URLs) of selected web documents) that the user (identified by user ID 410) requested to be saved from the set of search results provided by search engine system 225 to the user in response to the query 415.

Exemplary Process for Saving Search Results

Figure 5:
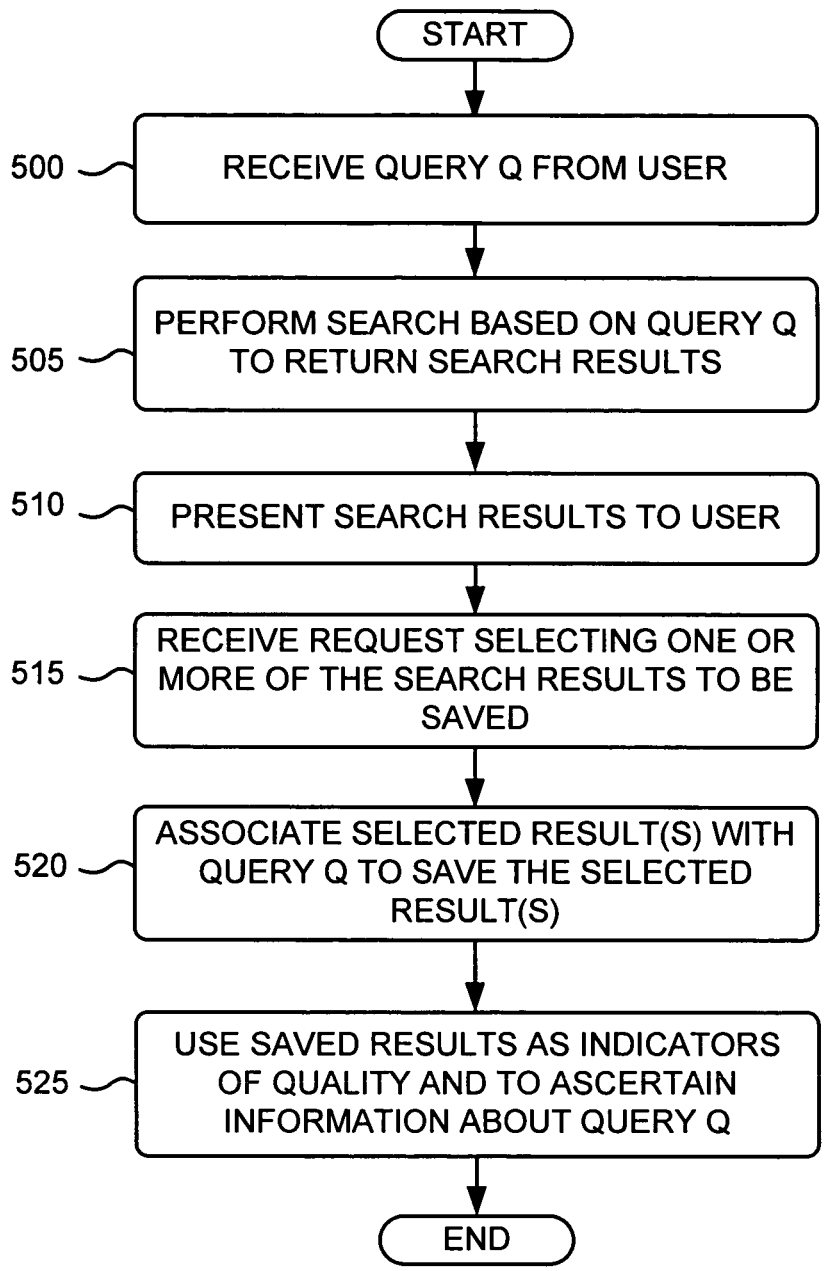
FIG. 5 is a flowchart of an exemplary process for saving the results of a document search in response to the request of a user according to an implementation consistent with the principles of the invention.

FIG. 5 is a flowchart of an exemplary process for saving the results of a document search in response to the request of a user. As one skilled in the art will appreciate, the process exemplified by FIG. 5 can be implemented in software and stored on a computer-readable memory, such as main memory 330, ROM 340, or storage device 350 of server 220.

Figure 6:
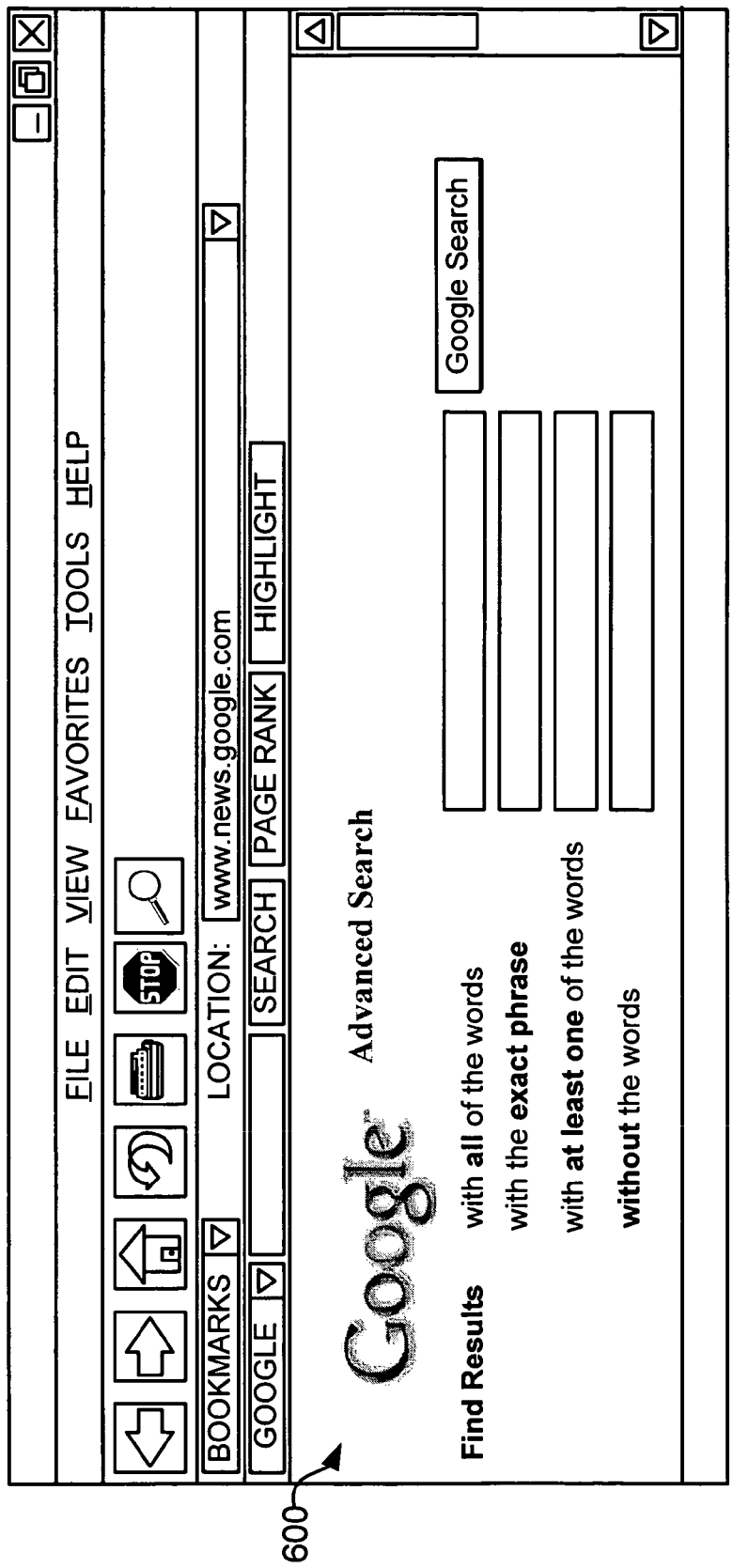
FIG. 6 is a diagram of an exemplary search document consistent with an aspect of the invention.
Figure 7:
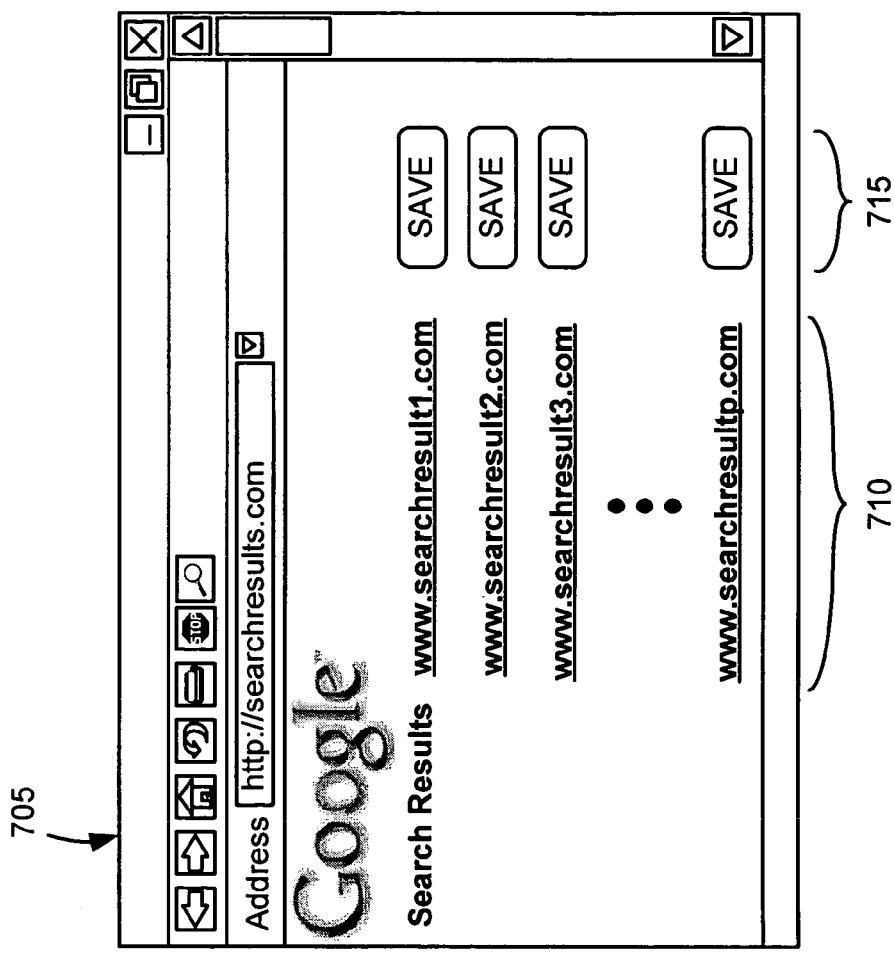
FIG. 7 is a diagram of an exemplary search result document consistent with an aspect of the invention.

The exemplary process may begin with the receipt of a query Q from a user at a client 210 (block 500). As shown in FIG. 6, the user may enter search query Q into a search document 600 provided by server 220. Search document 600 may include, for example, fields for entering search terms to be used in locating relevant documents (e.g., documents that include the search terms or possibly analogous terms). Search engine system 225 may perform a search, based on the received query Q, to return a set of search results (block 505). Search engine system 225 may search a corpus of documents stored in server(s) 230, or a repository of documents aggregated by server 220. Existing searching techniques may be used to identify documents that include one or more of the search terms of query Q. The search results may be presented to the user at client 210 (block 510). For example, as shown in FIG. 7, a document 705 may be sent to client 210 from which the user issued query Q. Document 705 may display one or more search results 710 that each may include, for example, a link to a corresponding document stored at server (s) 230.

A request selecting one or more of the search results to be saved may be received from the user at client 210 (block 515). As shown in FIG. 7, the user at client 210 may, for example, select one or more of search results 710 by clicking on a "save" button 715 adjacent to a search result. In another implementation (not shown), the user at client 210 may drag-and-drop a selected search result into a "save" icon. Server 220 may receive an indication of each selected search result from client 210 via network 240. The selected results may be associated with query Q (block 520), and then saved (e.g., in the data structure 400). For example, the selected results may be associated with query Q by storing the query Q (e.g., query 415) and the selected search result(s) (e.g., saved results 420) in appropriate fields of an entry 405 of saved results data structure 400. Optionally, the selected results may also be associated with a user identifier corresponding to the user that requested that the selected results be saved. The user identifier may be a pre-assigned global identifier (e.g., a user login name, an Internet Protocol (IP) address, an e-mail address, etc.) that uniquely identifies the user or a unique, anonymous identifier, assigned to the user at the time the selected search results are saved, that is not identifiable back to the user. In such a case, the selected results may be associated with query Q and the user by storing a user identifier (e.g., user ID 410) associated with the user, the query Q (e.g., query 415), and the selected search result(s) (e.g., saved results 420) in appropriate fields of an entry 405 of saved results data structure 400. In one implementation, the user may group together multiple saved search results. For example, the user may drag-and-drop multiple search results into a folder to save them together as a group. In another implementation, the user may label (or annotate), with descriptive text, a single search result, or multiple search results that have been grouped together. The label or annotation may include a one or two word description, or a multiple word description. This label, or annotation, may subsequently be shared with other users and also may be returned with the corresponding search results when the search results are returned as results of a subsequent search for a current user, or other users.

Saved results 420 may be used as indicators of quality and/or to ascertain information about query Q (block 525). For example, the saved results may be used as implicit indicators of document quality, or for determining various types of information about query Q. Further details of the use of the saved results are described below with respect to FIGS. 10A-10C.

Acts 500-520 may be selectively repeated for each query of a query session that may include multiple queries. At the end of the query session, the user may select the best results returned from all of the queries of the query session and save these best results. In one implementation, these saved best results for the query session may be grouped together as a set set (e.g., in a notebook or a folder).

Exemplary Saved Result Access Process

Figure 8:
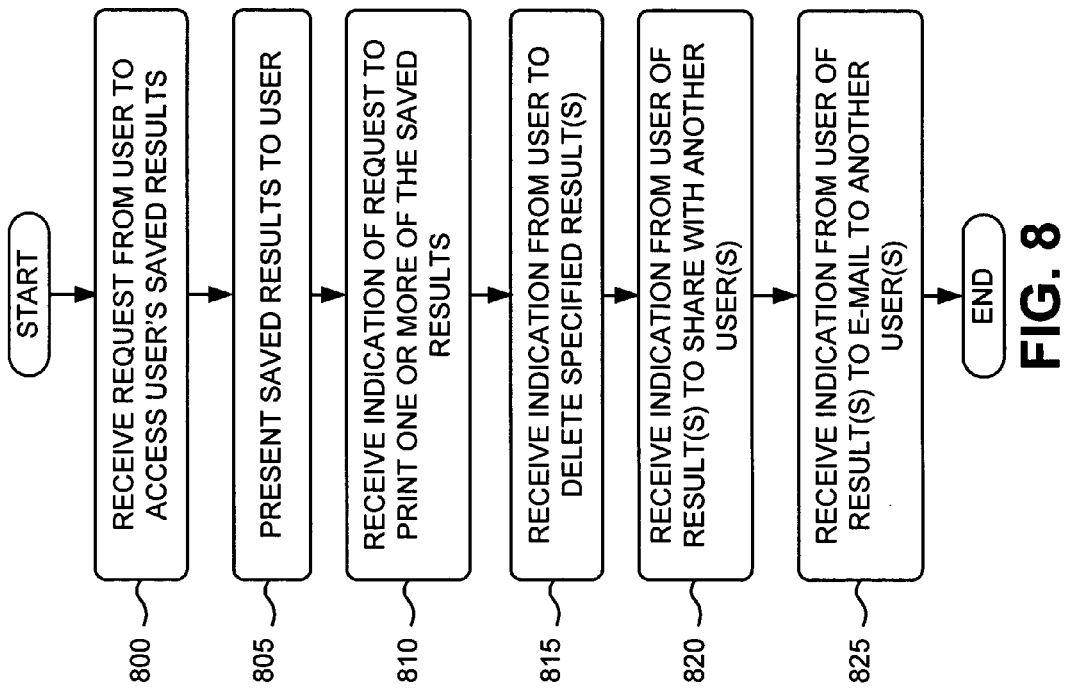
FIG. 8 is a flowchart of an exemplary process for accessing search results stored at a server consistent with implementations of the invention.

FIG. 8 is a flowchart of an exemplary process for accessing search results stored at a server according to an implementation consistent with the principles of the invention. As one skilled in the art will appreciate, the process exemplified by FIG. 8 can be implemented in software and stored on a computer-readable memory, such as main memory 330, ROM 340, or storage device 350 of server 220.

Figure 9:
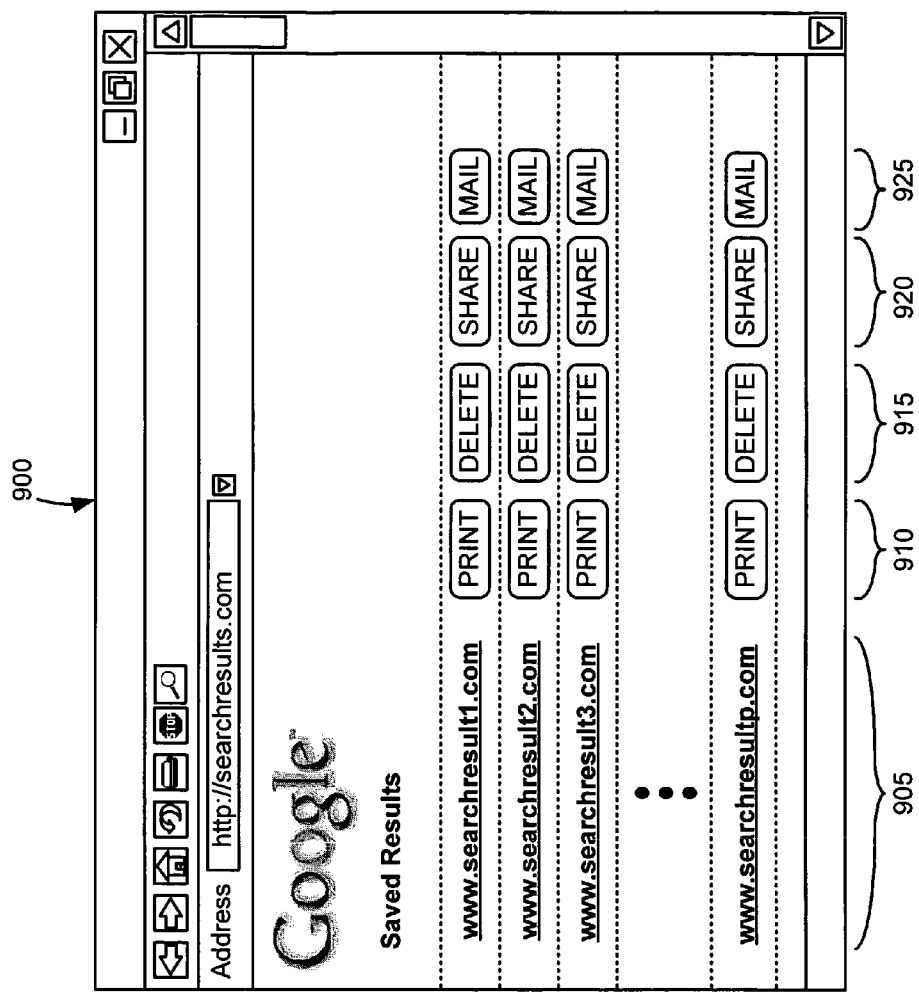
FIG. 9 is a diagram of an exemplary saved result document consistent with an aspect of the invention.

The exemplary process may begin with the receipt of a request from a user to access the user's saved results (block 800). The user may, for example, send a request to server 220 via network 240 using existing messaging techniques. The saved results may be presented to the user at a client 210 (block 805). Server 220, in response to receipt of the request from the user at a client 210, may use a user identifier 410 associated with the user to index data structure 400 and retrieve corresponding saved results 420. As shown in FIG. 9, the saved results 420 may be sent to the user at client 210 in a saved results document 900. Saved results document 900 may include a link(s) 905 corresponding to each result stored in saved results 420. In one implementation, the user may request access to the user's saved results for a particular query or a set of queries. In this implementation, saved results document 900 may display links for each result corresponding to each query or set of queries.

A request may be received from the user indicating one or more of the saved results that the user desires to have printed (optional block 810). As illustrated in FIG. 9, the user may select one or more of the results from saved results document 900 by, for example, clicking on a corresponding "print" button 910 located in proximity to each of the desired results. In response to selecting a result from saved results document 900, client 210, via a printer, may provide a hard copy of the document corresponding to the selected result. The request containing an indication of the selected saved results to be printed may be sent from client 210 to server 220 via network 240.

An indication may be received from the user specifying results of the saved results that the user desires to delete (optional block 815). As illustrated in FIG. 9, the user may select one or more of the results from saved results document 900 by, for example, clicking on a corresponding "delete" button 915 located in proximity to each of the results desired to be deleted. The request containing an indication of the selected saved results to be deleted may be sent from client 210 to server 220 via network 240. Server 220, in response to receipt of the request, may delete corresponding results from the saved results fields 420. Other techniques, other than just deleting saved results, may be used for managing saved results. For example, users may group saved results into sets, re-order them, annotate particular ones of the saved results, or perform other similar access and management functions. In one implementation, for example, saved search results from multiple queries may be grouped together (e.g., the best search results from the multiple queries) by a user. In such an implementation, the user may, for example, drag-and-drop the search results into a folder to group them together.

An indication may be received from the user specifying saved results that the user desires to share with another user(s) (optional block 820). As illustrated in FIG. 9, the user may select one or more of the results from saved results document 900 by, for example, clicking on a corresponding "share" button 920 located in proximity to each of the results desired to be shared. The request containing an indication of the selected results to be shared, and an indication of the user(s) with whom the selected results are to be shared, may be sent from client 210 to server 220 via network 240. Server 220, in response, may store the selected result(s) in a saved result field 420 of an entry 405 of data structure 400 whose user ID 410 value matches the user(s) indicated in the request. Any labels (e.g., descriptive text) associated with saved results (e.g., a set of saved results) by a user may also be shared with another user(s).

An indication may be received from the user specifying results of the saved results that the user desires to have e-mailed to another user(s) (optional block 825). As illustrated in FIG. 9, the user may select one or more of the results from saved results document 900 by, for example, clicking on a corresponding "mail" button 925 located in proximity to each of the results desired to be mailed to other user(s). In response to selection of "mail button" 925, an e-mail application at client 210 may send an electronic mail message to the other user(s) containing a link for each of the selected search results. The request containing an indication of the selected saved results to be mailed may be sent from client 210 to server 220 via network 240. Server 220, in response to receipt of the request, may make note of the results mailed to the other users.

Exemplary Saved Results Analysis Process

FIGS. 10A-10C are flowcharts of an exemplary process for analyzing search results saved by a server in response to requests from users consistent with implementations of the invention. As one skilled in the art will appreciate, the process exemplified by FIGS. 10A-10C can be implemented in software and stored on a computer-readable memory, such as main memory 330, ROM 340, or storage device 350 of server 220. The blocks described with respect to FIGS. 10A-10C provide further details to block 525 of FIG. 5B.

The exemplary process may begin with the retrieval of saved results associated with a given query Q for analysis (block 1000). In one implementation, server 220 may retrieve (e.g., from data structure 400) the results stored in a saved results field 420 corresponding to a given user identifier 410. In another implementation, server 220 may retrieve the results stored in search result fields 420 from multiple entries that correspond to a specified query. Blocks 1005-1045 below describe exemplary techniques for analyzing the saved search results.

Figure 11:
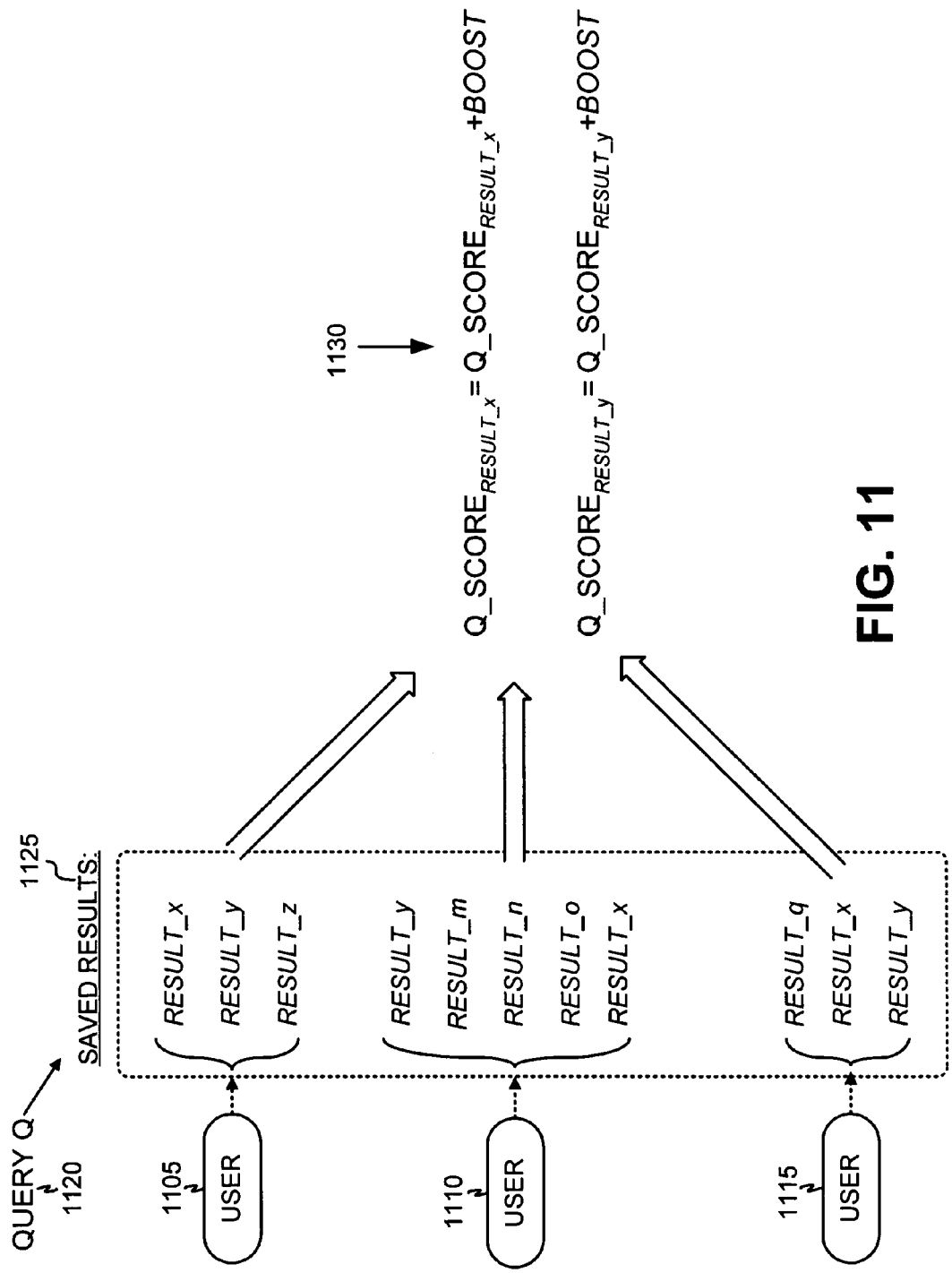
FIG. 11 is an exemplary diagram that depicts boosting quality scores associated with results saved by multiple users.

If users tend to save the same results, then the quality scores of those results may be boosted (block 1005). For example, as shown in FIG. 11, users 1105, 1110, and 1115 may issue a same (or nearly the same) query Q 1120, and may each save a selected set of results 1125 from search results returned to the users from a search engine. For results that are saved by multiple users (e.g., users 1105, 1110, and 1115), server 220 may boost a quality score (Q_SCORE) associated with those results. As shown in FIG. 11, for example, results RESULT_X and RESULT_Y have been saved by users 1105, 1110, and 1115, and therefore a value (BOOST) may be added to the quality score 1130 for each of results RESULT_X and RESULT_Y. The boost given to a saved result may be query-dependent (i.e., added only for queries that are similar to query Q), or query-independent (i.e., added for all queries). Thus, the measure of quality for a document that is saved may be boosted in a query-dependent and/or query-independent manner. These techniques (boosting scores in a query-dependent and/or query-independent manner) may also be used with respect to the other types of boosts described herein.

Figure 12:
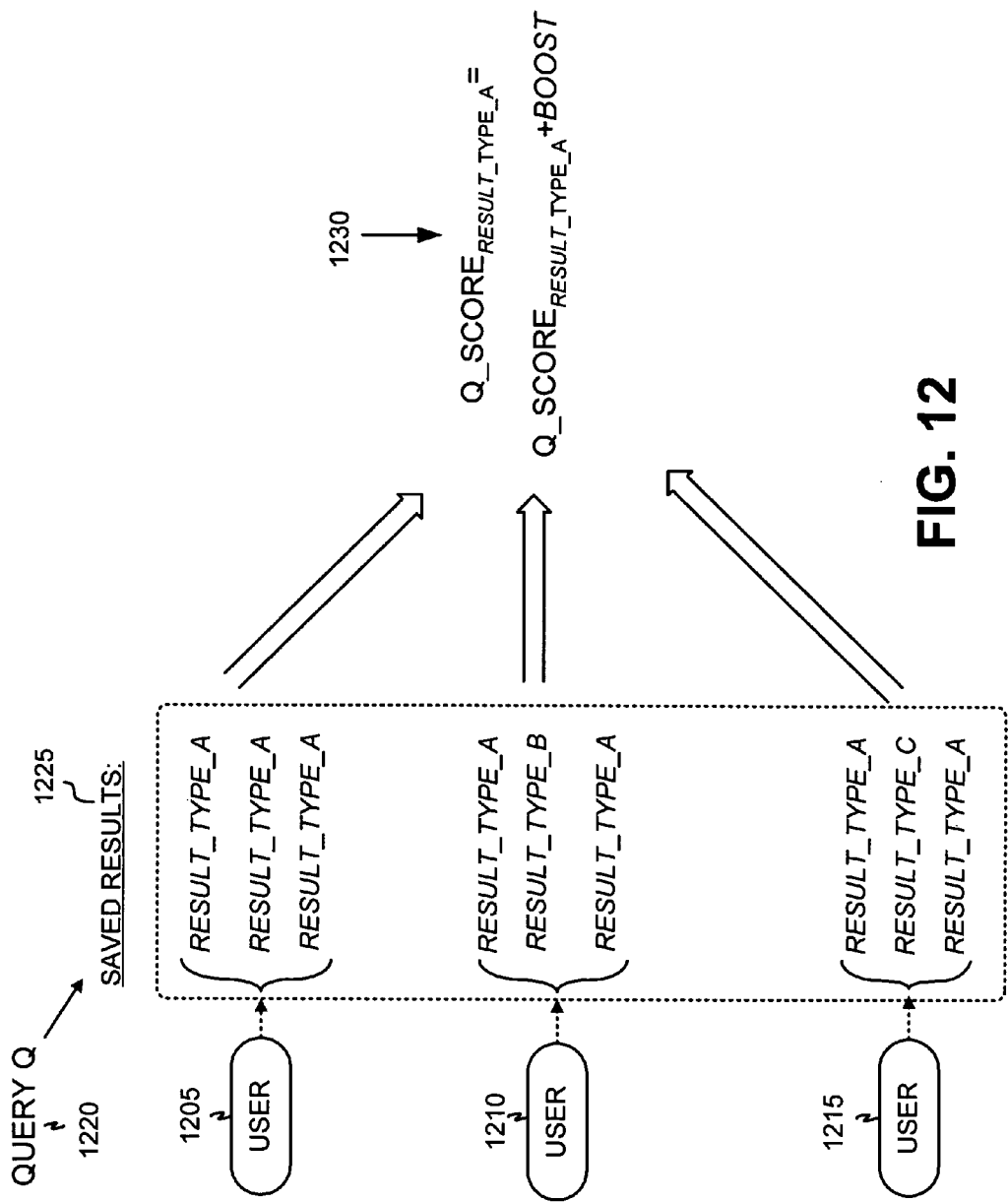
FIG. 12 is an exemplary diagram that depicts boosting quality scores associated with types of results saved by multiple users.

If users tend to save one or more types of results over other types of results, then the quality scores of the saved types of results may be boosted (block 1010). For example, as shown in FIG. 12, users 1205, 1210, and 1215 may issue a same (or nearly the same) query Q 1220 and may each save a selected set of results, with each result having a result type, from search results returned to the users from a search engine. For result types that are saved by multiple users (e.g., users 1205, 1210, and 1215), server 220 may boost a quality score (Q_SCORE) associated with results having that result type in subsequent searches. As shown in FIG. 12, for example, results having a result type RESULT_TYPE_A have been saved by users 1205, 1210, and 1215, and therefore a value (BOOST) may be added to a quality score 1230 for each result having RESULT_TYPE_A for subsequently executed searches. As one specific example, assume that users 1205, 1210, and 1215 generally only save image results for query Q1220 and not web document results. It can be inferred, therefore, that for query Q 1220, image results may be more appropriate than web document results, and that image results should therefore be ranked higher for that query. Quality scores may also be boosted for saved document types on a query-independent basis.

Figure 13:
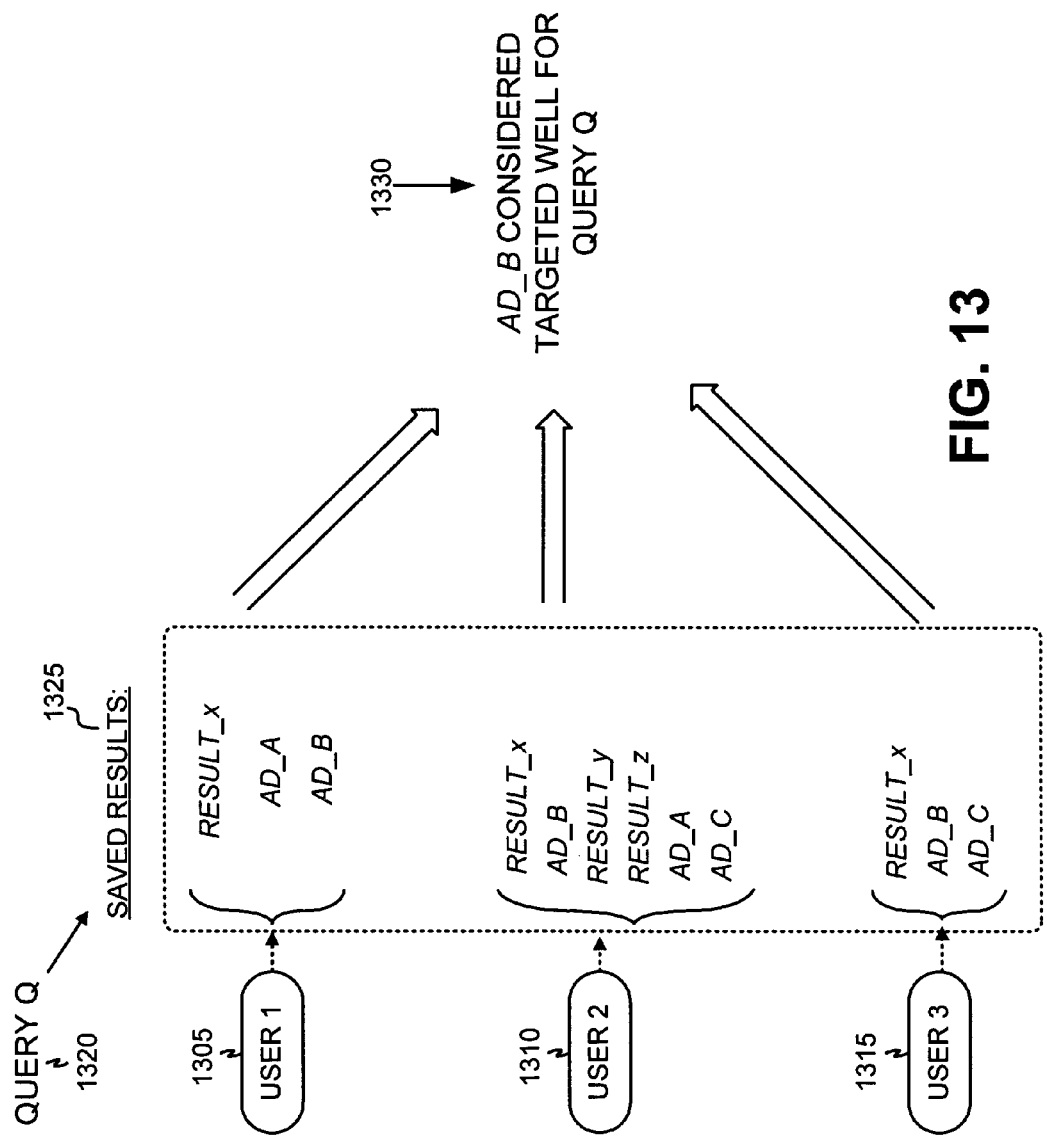
FIG. 13 is an exemplary diagram that depicts using saved advertisements to evaluate whether a given advertisement has been targeted well for a given search query.

If users save advertisements shown in response to query Q, then the advertisements may be considered to be targeted well for that particular query (block 1015). For example, as shown in FIG. 13, users 1305, 1310, and 1315 may issue a same (or nearly the same) query Q 1320 and may each save a selected set of results from search results returned to the users by a search engine, as well as save advertisements shown in conjunction with the search results. For ads that are saved by multiple users (e.g., users 1305, 1310, and 1315), server 220 may note that the ads are targeted well for query Q 1320. As shown in FIG. 13, for example, AD_B (shown along with ads AD_A or AD_C to users 1305, 1310, and 1315 in response to query Q 1320) is saved by users 1305, 1310, and 1315. Server 220 may infer that AD_B is targeted well (e.g., well-matched or relevant) for query Q 1320. Additionally, if users save advertisements in response to query Q, then query Q may be considered commercial in nature. In such a case, when query Q is subsequently executed again, links to product reviews or to related commercial web sites or documents may be returned (or a quality score associated with such reviews/sites/documents may be boosted).

Figure 14:
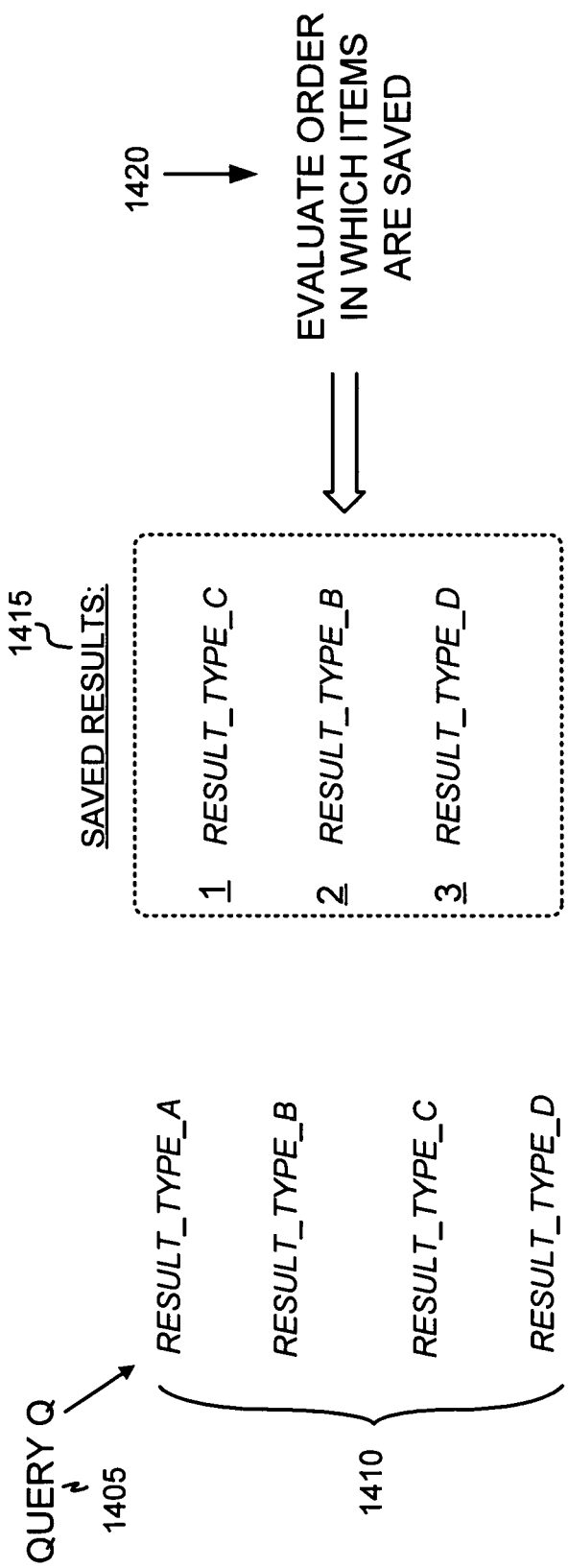
FIG. 14 is an exemplary diagram that depicts the evaluation of an order in which search results are saved.

If search results contain multiple types of information, then the order in which the items are saved can be evaluated (block 1020; FIG. 10B). For example, as shown in FIG. 14, a user may issue a query Q 1405 and a search engine may return multiple search results to the user based on query Q 1405. The returned search results may include multiple result types 1410, such as, for example, RESULT_TYPE_A, RESULT_TYPE_B, RESULT_TYPE_C and RESULT_TYPE_D. The user may save 1415 selected ones of the search results in a specified order. For example, as shown in FIG. 14, the user may first save a search result having the result type RESULT_TYPE_C, may then save a search result having the result type RESULT_TYPE_B, and lastly may save a search result having the result type RESULT_TYPE_D. Server 220 may then evaluate 1420 the order in which the search results are saved, for example, to determine what types of search results draw the most attention. In a specific example, assume that advertisements, web documents, images, and product documents are provided to the user in response to query Q 1405. Assume further that the user saves the results in the order 1) web documents, 2) images, 3) advertisements, and 4) product documents. This order of saved results may indicate that the user issuing the query prefers web documents over images, images over advertisements, and advertisements over product documents.

Figure 15:
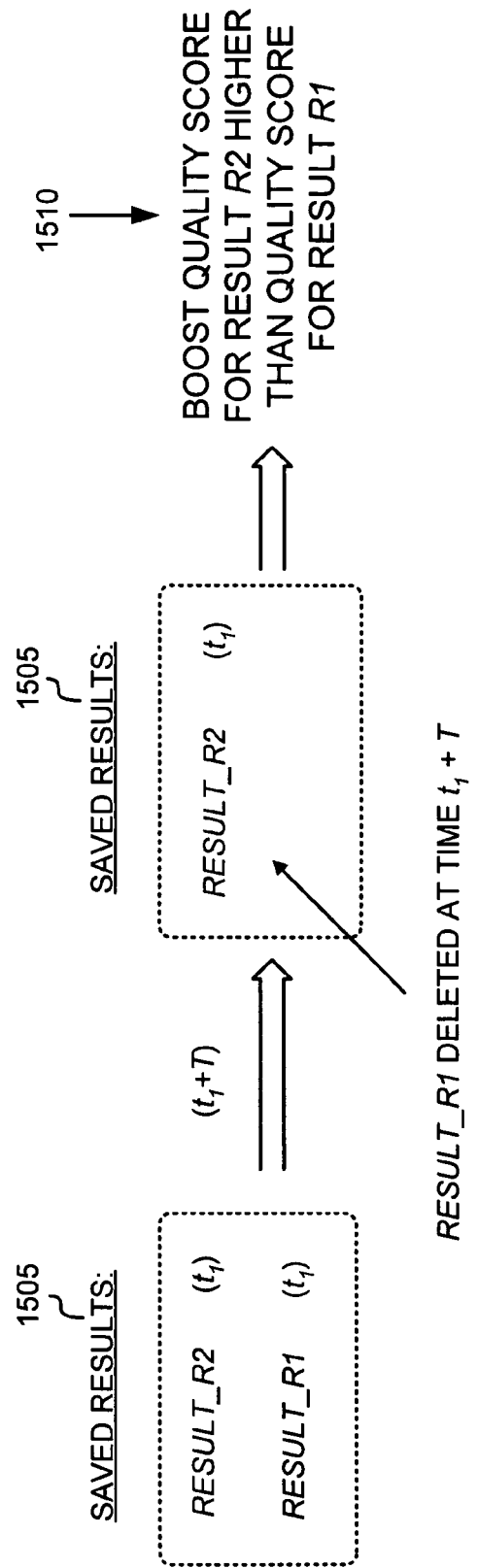
FIG. 15 is an exemplary diagram that depicts altering quality scores associated with saved search results based on when certain search results are deleted from the saved results.

If a saved result R1 is deleted from the saved results within a short period of time, while another result R2 is kept, and results R1 and R2 were saved in response to the same query, then the quality score for result R2 may be boosted higher than the quality score for result R1 (block 1025). For example, as shown in FIG. 15, results RESULT_R1 and RESULT_R2 may be saved in saved results 1505 at time $t_1$. At time $t_1$+T, result RESULT_R1 may be deleted by the user from saved results 1505, while result RESULT_R2 is retained in saved results 1505. The quality score for result RESULT_R2 may thus be boosted 1510 higher than the quality score for result RESULT_R1 based on the deletion of RESULT_R1 from saved results 1505.

Figure 16:
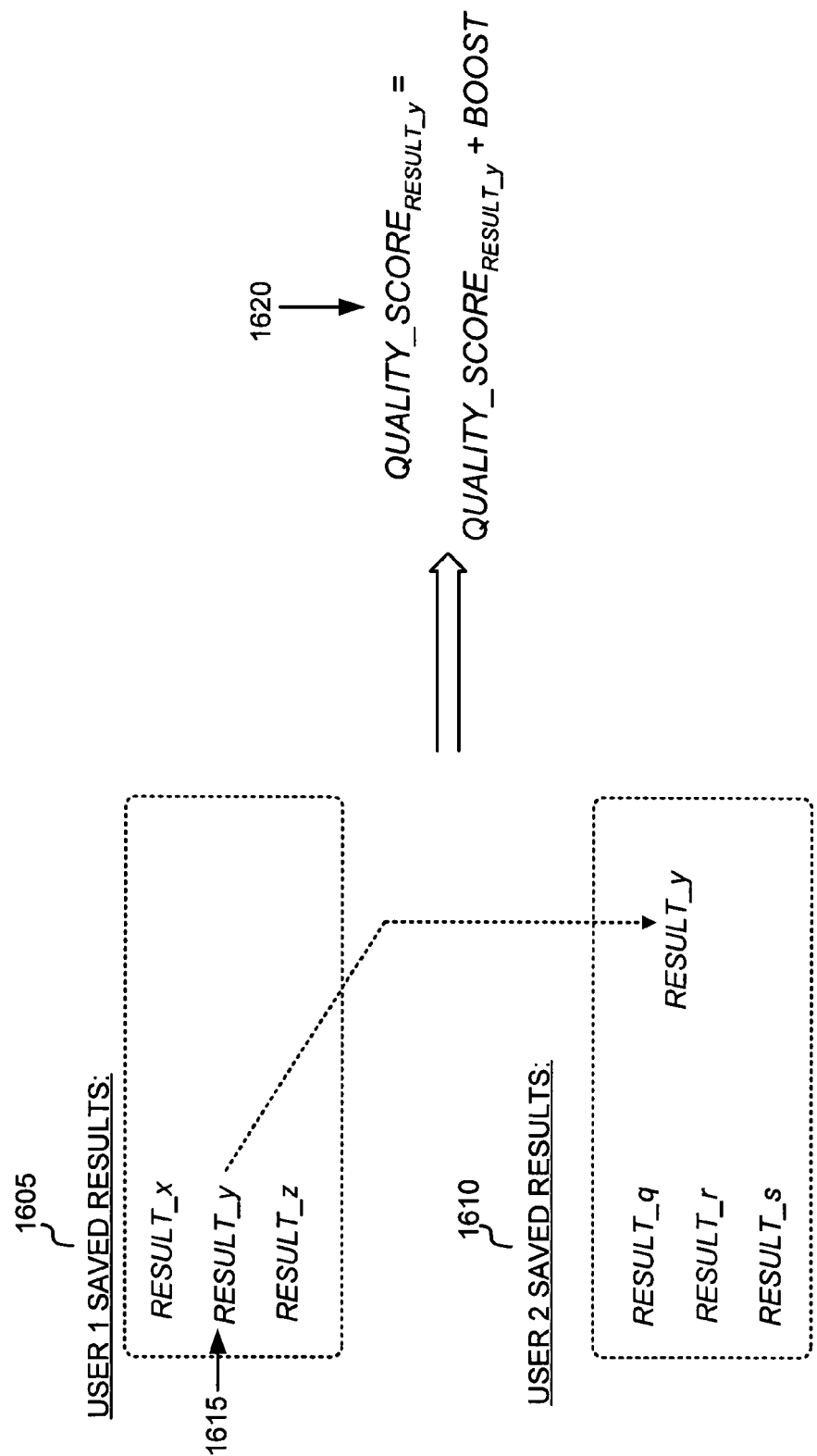
FIG. 16 is an exemplary diagram that depicts altering quality scores associated with saved search results that are shared between users.

The quality score(s) for results shared with other users may be boosted (block 1030). For example, as shown in FIG. 16, a user (USER 1), who saved a set of results 1605, may share a result 1615 (RESULT_y) with another user (USER 2), who saved a set of results 1610. Shared result 1615 may thus be added to user 2's saved results 1610. Based on sharing of the result RESULT_y, the quality score $QUALITY\_SCORE_{RESULT\_y}$ associated with RESULT_y may be boosted 1620. Sharing of RESULT_y may therefore serve as an implicit indicator of the quality of RESULT_y.

Figure 17:
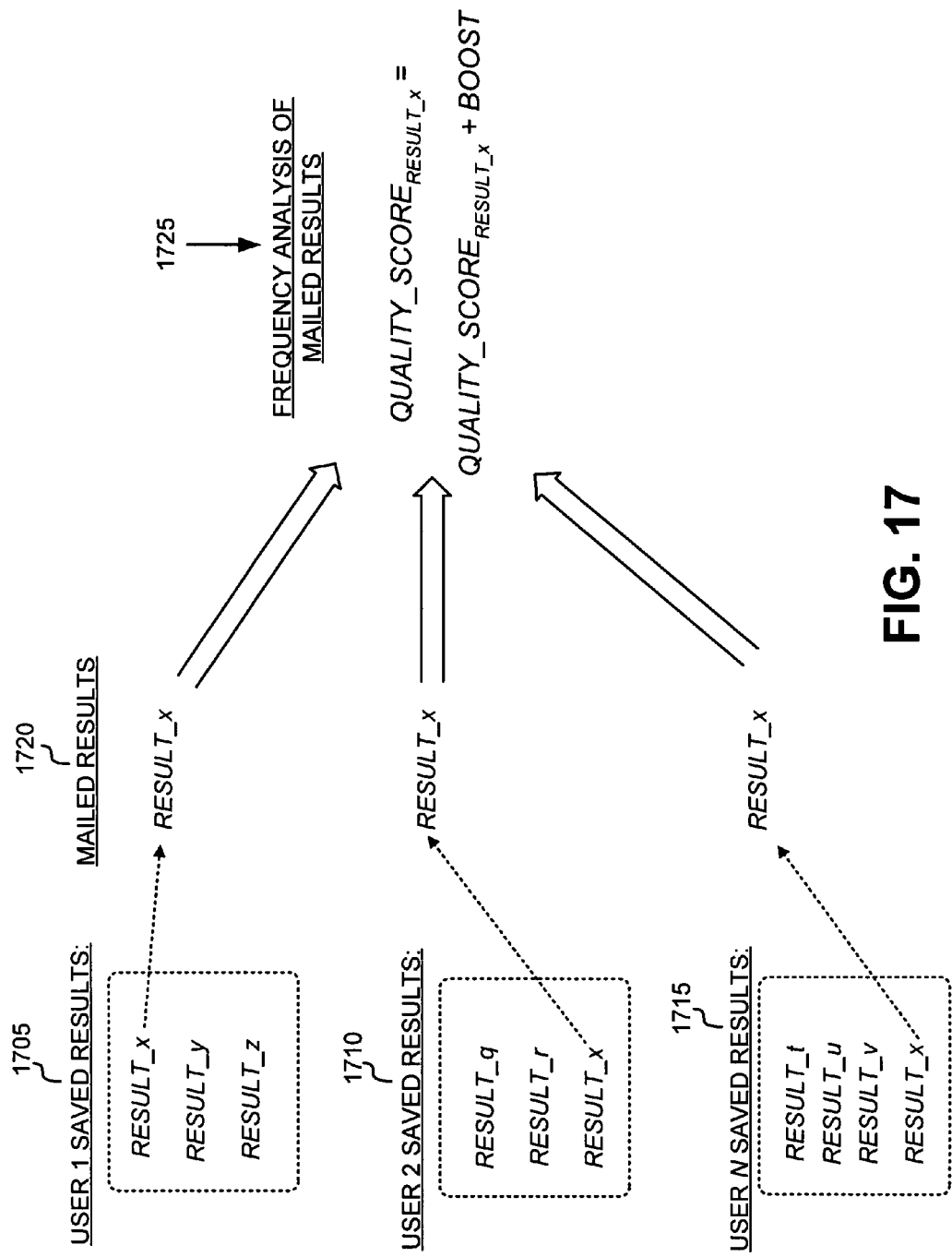
FIG. 17 is an exemplary diagram that depicts altering quality scores associated with saved search results based on an analysis of a frequency of mailings of certain ones of the saved search results.

The quality score(s) for particular results may be boosted based on an analysis of a frequency of mailings of the results by users (block 1035, FIG. 10C). For example, as shown in FIG. 17, a result (RESULT_x) may be mailed from saved results 1705, 1710, and 1715 associated with three different respective users user 1, user 2, and user 3. An analysis of the mailed results 1720 (e.g., RESULT_x) may be performed to determine the frequency of mailings of each result of mailed results 1720. Based on a frequency analysis 1725 of mailed results 1720, a quality score (e.g., QUALITY_SCORE$_{RESULT\_x}$) associated with certain ones of the mailed results (e.g., RESULT_x) may be boosted. Results that are mailed more frequently may thus have their quality scores boosted higher than other results.

The results saved by a given user may be used to boost the quality scores for similar search results for that user in the future (block 1040). One search result (e.g., document) may be determined to be similar to another search result if both search results:

1) are located on the same site (i.e., www.companyX.com),
2) have the same ratio of images to text,
3) have a majority of the same words,
4) have a majority of the same uncommon words (e.g., if both documents contain the word "lemonade" instead of a common word such as "the" or "of"),
5) contain the same outgoing links,
6) are linked to be the same sites (i.e., the same incoming links),
7) have the same meta-data tags, or
8) have the same formatting/layout.

Figure 18:
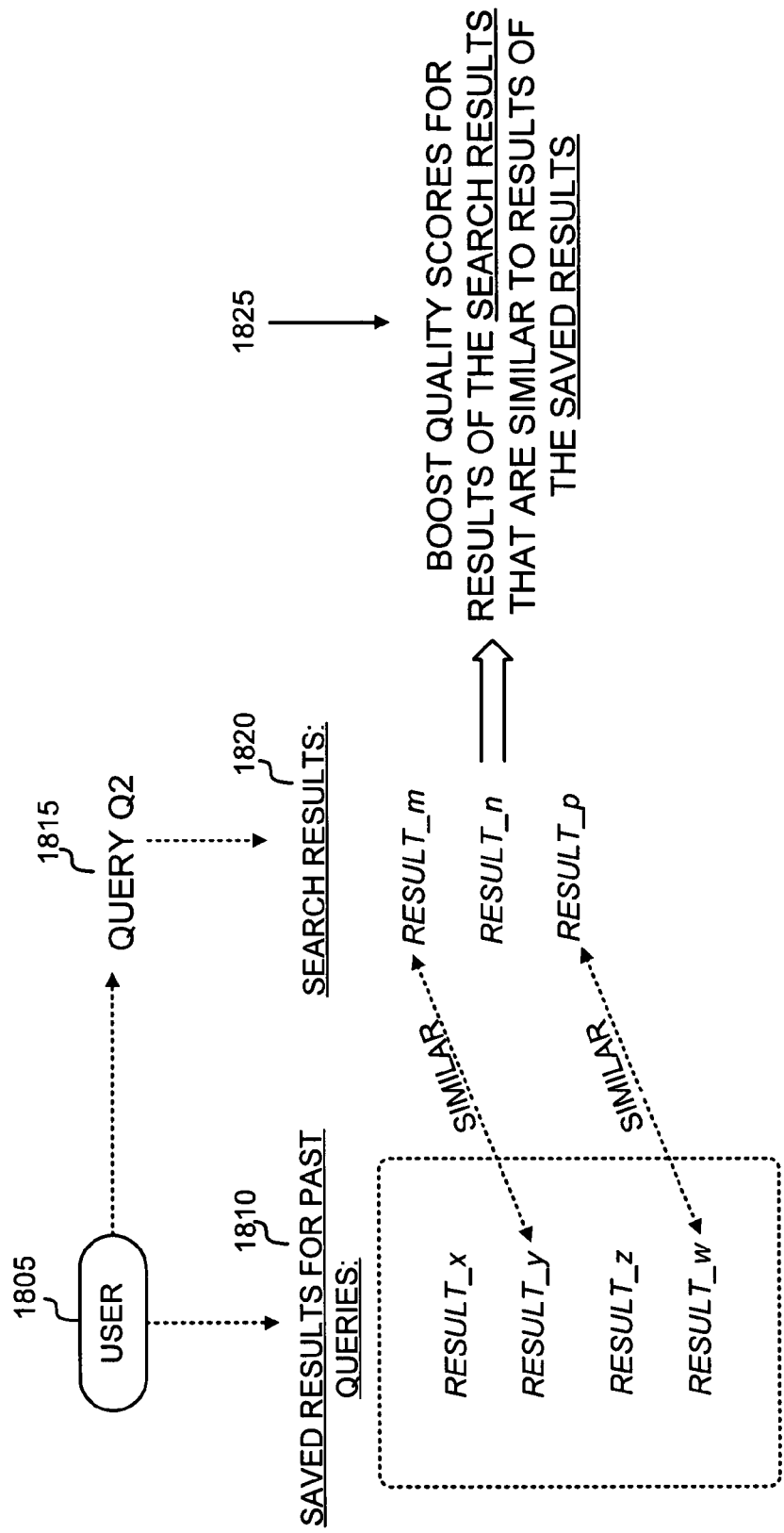
FIG. 18 is an exemplary diagram that depicts altering quality scores associated with search results that are similar to search results previously saved by a user.

For example, as shown in FIG. 18, a set of saved results 1810 from past queries may be associated with a user 1805. User 1805 may issue a new query Q2 1815, and the search engine may determine a set of search results 1820 based on query Q2 1815. Quality scores of results of search results 1820 may be boosted 1825 for those results that are similar to results of saved results 1810. In other implementations, one search result (e.g., document) may be determined to be similar to another search result using the techniques described in U.S. application Ser. Nos. 10/462,690 and/or 10/029,883, the disclosures of which are incorporated by reference herein.

The quality score(s) for particular documents saved for query Q, that are returned as results of a different query $Q_1$, may be boosted (block 1045). For example, if search query Q is "SUV" and a document (document $D_1$) containing content related to sports utility vehicle (SUV) comparisons is saved from the documents returned as results of a search based on the search query "SUV," then, if another search query $Q_1$ is "mdx" and document $D_1$ is returned as a result of a search based on query $Q_1$, a quality score associated with document $D_1$ may be boosted. The saving of particular results for a given query Q may, thus, be used as a query-independent quality measurement for particular documents for queries other than query Q. The boost in the quality score(s) of the particular documents saved for query Q may be less than the boost in the quality score(s) for other query-dependent measures of quality (i.e., less than the boost in quality score(s) for documents saved by users who issued query $Q_1$).

The quality score(s) for multiple search results that have been grouped together as a set may be boosted (block 1050). The quality score for each search result in the set may be boosted a same amount for subsequent searches from the user that grouped the search results together, or for other users. In one implementation, for example, saved search results from multiple queries may be grouped together (e.g., the best search results from the multiple queries) by a user. In such an implementation, the user may, for example, drag-and-drop the search results into a folder to group them together.

Exemplary Document Ranking Process Using Boosted Quality Scores

Figure 19:
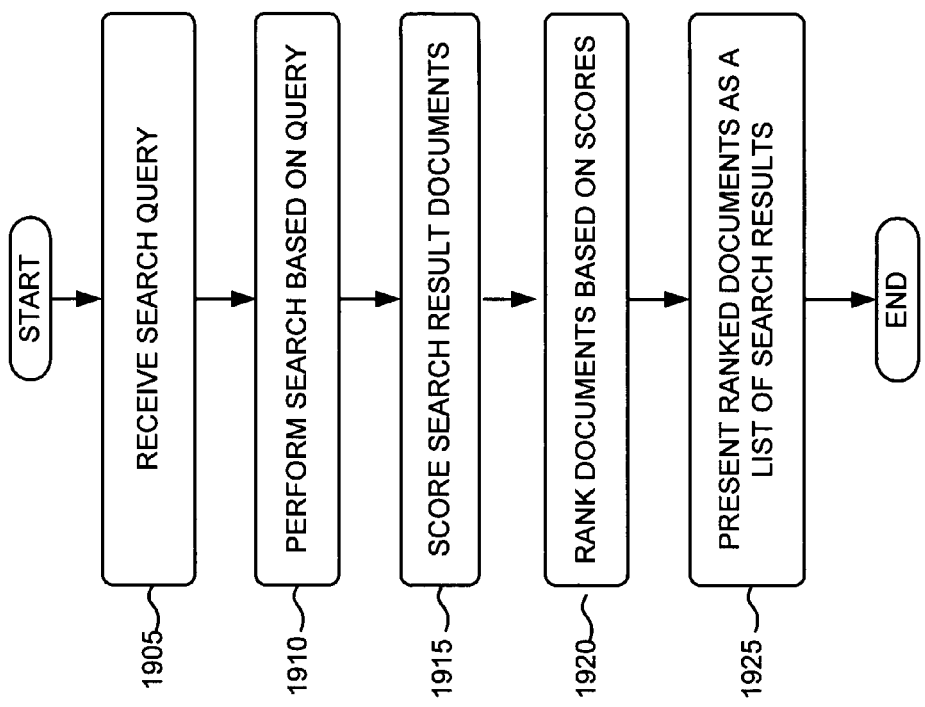
FIG. 19 illustrates an exemplary process for ranking search result documents using quality scores boosted in accordance with the process illustrated in FIGS. 10A-10C.

FIG. 19 is a flowchart of an exemplary process for ranking search result documents using quality scores that may be boosted in accordance with the exemplary techniques described above with respect to FIGS. 10A-10C. As one skilled in the art will appreciate, the process exemplified by FIG. 19 can be implemented in software and stored on a computer-readable memory, such as main memory 330, ROM 340, or storage device 350 of server 220. The blocks described with respect to FIG. 19 provide details of one exemplary implementation of block 525 of FIG. 5B.

The exemplary process may begin with the receipt of a search query (block 1905) (FIG. 19). In one implementation, a user may use a web browser associated with a client 210 to provide the search query to server 220. A search may then be performed based on the received search query (block 1910). Search engine system 225 may use existing searching techniques to identify documents that include one or more of the terms of the received search query.

The documents identified as search results may be scored (block 1915). For example, a quality score (e.g., an information retrieval (IR) score) may be generated for the identified documents. The quality score for certain documents of the search result documents may be adjusted upwards, or possibly downwards, based on an analysis of previous search results saved by various users, as described above. The quality score may be additionally based on the number of occurrences of the search terms in the document and, possibly, weights assigned to the search terms. The quality score for each search result document may further be adjusted based on where the search terms occur within the document (e.g., title, content, etc.) or characteristics of the search terms (e.g., font, size, color, etc.). The quality score may also, or alternatively, be adjusted based on the proximity of the search terms when multiple search terms are present. Yet other techniques for generating or adjusting a quality score for a search result document are known to those skilled in the art. For example, query-independent quality score generation techniques may be used. PageRank is one such query-independent quality score generation technique and is described in "The Anatomy of a Large-Scale Hypertextual Search Engine" by S. Brin and L. Page, $7^{th}$ International World Wide Web Conference, Brisbane, Australia and U.S. Pat. No. 6,285,999, the disclosures of which are incorporated by reference herein.

The identified search result documents may be ranked (e.g., sorted) based on their quality scores (block 1920) and presented as a list of search results (block 1925). The list of search results may, for example, be provided to the user at a client 210 as an HTML document. Alternatively, the search results may be provided according to a format agreed upon by the search engine and the client (e.g., Extensible Markup Language (XML)).

Figure 20:
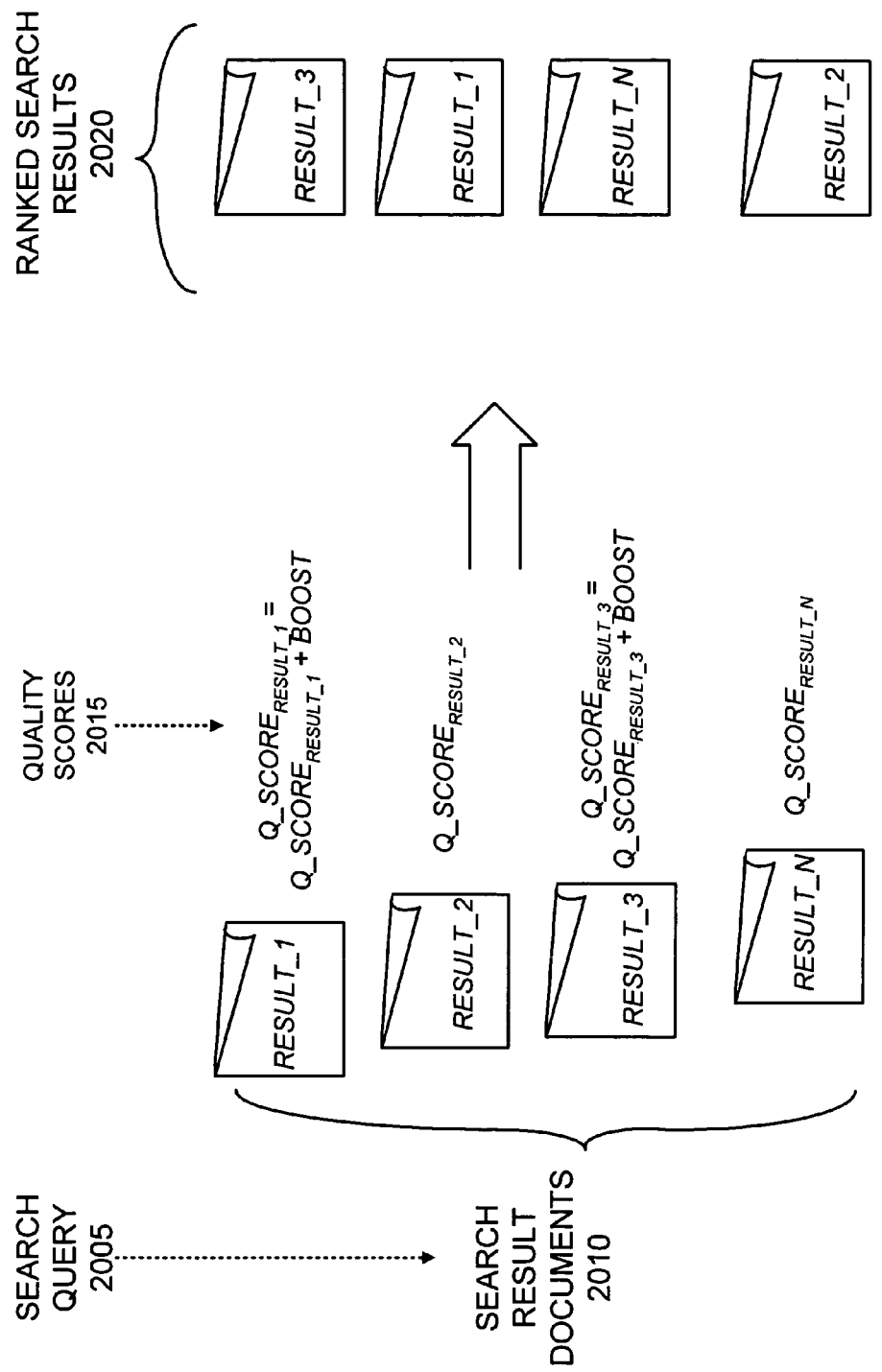
FIG. 20 is an exemplary diagram that depicts the ranking of search result documents using quality scores boosted in accordance with the process illustrated in FIGS. 10A-10C.

FIG. 20 illustrates one example of the use of boosted quality scores for adjusting the ranking of search results. As shown in FIG. 20, a search query 2005 may be received from a user, and search result documents 2010 may be returned as results of an executed search. Quality scores 2015 may be assigned to each of the search result documents 2010, and certain ones of the search result documents may have their assigned quality score boosted using, for example, the exemplary process described above with respect to FIGS. 10A-10C. The search result documents 2010 may then be sorted based on the quality scores 2015 to produce ranked search results 2020. For example, as shown in FIG. 20, the quality scores of RESULT_1 and RESULT_3 have been boosted and, thus, these search result documents are ranked higher than other results in the set of ranked search results 2020.

CONCLUSION

Systems and methods consistent with the principles of the invention enable the use of search results saved by users for providing feedback into document scoring functions. The saved results may be used as a quality signal (along with other quality signals) in existing document ranking functions. For example, an analysis of the results saved by different users may be used to affect the ranking of documents for subsequently performed document searches.

The foregoing description of preferred embodiments of the present invention provides illustration and description, but is not intended to be exhaustive or to limit the invention to the precise form disclosed. Modifications and variations are possible in light of the above teachings, or may be acquired from practice of the invention. For example, while series of acts have been described with regard to FIGS. 5, 10A-10C, and 19, the order of the acts may be modified in other implementations consistent with the principles of the invention. Further, non-dependent acts may be performed in parallel. While implementations of the invention have described the saved results as being saved in a database associated with a server, other implementations may be client-based where the saved results may be stored in a "cookie" at a client 210. In yet further implementations, saved results may be stored in server-based cookies. The saved results may thus be stored at any location as long as the search engine may access the shared results for purposes of analysis. Some implementations of the invention may be implemented in a stand-alone machine (e.g., a stand-alone client) instead of exclusively in a client-server context. In such implementations, the invention may be used, for example, in the context of a desktop search application (e.g., Google Desktop Search), where both searches and quality score adjustments may be performed on one machine. Furthermore, any alterations in quality scores for search results, as described above with respect to FIGS. 10A-10C, may additionally be applied to quality scores relating to advertisements associated with, or generated by, the search results.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects have been described without reference to the specific software code, it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-readable memory device storing computer-executable instructions, the computer-readable memory device comprising:
   one or more instructions for receiving, from a user, a first request to perform a search based on a first search query;
   one or more instructions for providing a first set of search results to the user based on the first search query;
   one or more instructions for receiving a request, from the user, to save one or more selected search results of the first set of search results;
   one or more instructions for saving, in a memory and in response to the request, information associated with the selected one or more search results;
   one or more instructions for receiving, from the user, a second request to perform a search based on a second search query, where the second request is received subsequent to the first request;
   one or more instructions for generating a second set of search results based on the second search query;
   one or more instructions for determining that a particular search result, in the second set of search results, is similar to a selected search result of the selected one or more search results based on the saved information, where the one or more instructions for determining includes at least two of:
      one or more instructions for determining whether the particular search result and the selected search result have a plurality of outgoing links pointing to the same documents,
      one or more instructions for determining whether the particular search result and the selected search result have a plurality of incoming links coming from the same documents,
      one or more instructions for determining whether the particular search result and the selected search result have a same format, or
      one or more instructions for determining whether the particular search result and the selected search result have a same layout;
   one or more instructions for boosting a score of the particular search result to obtain a boosted score when the particular search result is determined to be similar to the selected search result; and
   one or more instructions for providing the second set of search results including providing the particular search result based on the boosted score.

2. The computer-readable memory device of claim 1, where the selected one or more search results include multiple search result documents that have been saved as saved search results in a memory; and
   where the computer-readable memory device further comprises:
      one or more instructions for receiving a request, from the user, to delete a first result of the saved search results from the memory;
      one or more instructions for deleting the first result from the saved search results in response to the request to delete the first result; and
      one or more instructions for increasing a quality score associated with other results of the saved search results in response to deleting the first result.

3. The computer-readable memory device of claim 1, where the one or more instructions for boosting the score of the particular search result include one or more instructions for adding a particular value to the score of the particular search result to obtain the boosted score.

4. The computer-readable memory device of claim 1, where the one or more instructions for determining that the particular search result is similar to the selected search result, includes:
   one or more instructions for determining that the search result and the selected search result are located on a same web site,
   one or more instructions for determining that the search result and the selected search result have a same ratio of images to text, one or more instructions for determining that a majority of words, in the search result and the selected search result, match, one or more instructions for determining that a majority of uncommon words, in the search result and the selected search result, match, one or more instructions for determining that the search result and the selected search result have a plurality of outgoing links pointing to the same documents, one or more instructions for determining that the search result and the selected search result have a plurality of incoming links coming from the same documents, one or more instructions for determining that the search result and the selected search result have same meta-data tags, one or more instructions for determining that the search result and the selected search result have a same format, and one or more instructions for determining that the search result and the selected search result have a same layout.

5. A method comprising:

receiving, at a device of one or more devices, a search query from a user;

performing, by a device of the one or more devices, a first search of a collection of documents, using the search query, to identify a set of search result documents;

generating, using a device of the one or more devices, a quality score for each of a plurality of search result documents in the set of search result documents;

providing, by a device of the one or more devices, information regarding the plurality of search result documents to the user based on the quality scores for the plurality of search result documents;

receiving, from the user and by a device of the one or more devices, a request to save a selected search result document of the plurality of search result documents;

saving, by a device of the one or more devices, data associated with the selected search result document in response to the request to save the selected search result document;

receiving, at a device of the one or more devices, a second search query from the user;

performing, by a device of the one or more devices, a second search, based on the second search query, to generate a list of search result documents;

determining, by a device of the one or more devices, that a search result document, in the list of search result documents, is similar to the selected search result document based on the saved data and, where determining that the search result document is similar to the selected search result document includes at least two of:

determining whether the search result document and the selected search result document have a plurality of outgoing links pointing to the same documents, determining whether the search result document and the selected search result document have a plurality of incoming links coming from the same documents, determining whether the search result document and the selected search result document have a same format, or determining whether the search result document and the selected search result document have a same layout, boosting, by a device of the one or more server devices, a quality score of the search result document, to obtain a boosted quality score, when the search result document is determined to be similar to the selected search result document;

ranking, by a device of the one or more devices, the search result document, within the list of search result documents, based on the boosted quality score; and outputting, by a device of the one or more devices, the list of search result documents, including the ranked search result document, for presentation on a display of a client device.

6. The method of claim 5, where one or more advertisements are associated with the selected search result document, and where the method further comprises:

receiving a request, from the user, to save one of the advertisements;

saving the one of the advertisements in response to the request to save the one of the advertisements; and identifying the search query as commercial in nature based on saving the one of the advertisements.

7. The method of claim 6, further comprising:

providing, to the user, links to product reviews, or to commercial documents or sites, that are related to the one of the advertisements when the search query is identified as commercial in nature.

8. The method of claim 6, further comprising:

adjusting quality scores associated with product reviews, or commercial documents or sites, that are related to the one of the advertisements in response to identifying the search query as commercial in nature.

9. The method of claim 5, where the list of search results includes the selected search result document, and where the method further includes:

boosting the quality score associated with the selected search result document to obtain a boosted score; and ranking the selected search result document, within the list of search result documents, based on the boosted score.

10. The method of claim 5, where boosting the quality score includes:

increasing the quality score, associated with the search result document, by adding a particular value to the quality score to obtain the boosted quality score.

11. The method of claim 5, further comprising:

adjusting a quality score associated with an advertisement that is associated with the search result document.

12. The method of claim 5, where the selected search result document is one of multiple search result documents, from the plurality of search result documents, that have been saved as saved search results in a memory; and where the method further comprises:

evaluating an order in which the multiple search result documents are selected for saving by the user;

identifying a search result type, of a plurality of search result types, corresponding to each of the multiple search result documents;

determining which of the identified search result types is preferred for the search query based on the order in which the multiple search result documents are selected for saving by the user; and using a result of the determination of which of the identified search result types is preferred for the search query to influence how search results are presented for subsequent searches performed using the search query.

13. The method of claim 5, where the selected search result document is one of multiple search result documents, from the plurality of search result documents, that have been saved as saved search results in a memory; and where the method further comprises:

receiving a request, from the user, to delete a first result, of the saved search results, from the memory;

deleting the first result from the saved search results in response to the request to delete the first result; and increasing a quality score associated with a second result, of the saved search results, in response to deleting the first result.

14. The method of claim 5, where determining that the search result document is similar to the selected search result document, includes:

determining that the search result document and the selected search result document are located on a same web site, determining that the search result document and the selected search result document have a same ratio of images to text, determining that a majority of words, in the search result document and the selected search result document, match, determining that a majority of uncommon words, in the search result document and the selected search result document, match, determining that the search result document and the selected search result document have a plurality of outgoing links pointing to the same documents, determining that the search result document and the selected search result document have a plurality of incoming links coming from the same documents, determining that the search result document and the selected search result document have same meta-data tags, determining that the search result document and the selected search result document have a same format, and determining that the search result document and the selected search result document have a same layout.

15. A system, comprising:

one or more computer devices comprising:

means for receiving, from a user, a first request to perform a search, where the first request includes a first search query;

means for performing a first search of a collection of documents, based on the first search query, to identify a set of search result documents;

means for receiving a request to save a selected search result document of the plurality of search result documents;

means for saving information associated with the selected search result document in response to the request to save the selected search result document;

means for receiving, from the user, a second request to perform a search, where the second request includes a second search query, and where the second request is received after the first request is received;

means for performing a second search, based on the second search query, to generate a list of search result documents;

means for identifying a particular search result document, in the list of search result documents, that is similar to the selected search result document based on the saved information and, where the means for identifying includes at least two of:

means for determining whether the particular search result document and the selected search result document have a plurality of outgoing links that point to the same documents, means for determining whether the particular search result document and the selected search result document have a plurality of incoming links that come from the same documents, means for determining whether the particular search result document and the selected search result document have a same format, or means for determining whether the particular search result document and the selected search result document have a same layout;

means for boosting, based on identifying whether the particular search result document is similar to the selected search result document, a score for the particular search result document to obtain a boosted score; and means for providing the list of search result documents, where the means for providing includes means for providing the particular search result document based on the boosted score.

16. The system of claim 15, where the means for providing the list of search result documents includes:

means for forming a ranked list of documents based on the list of search result documents, where the particular search result document is included in the ranked list of documents based on the boosted score.

17. The system of claim 15, where the list of search result documents includes the particular search result document and the selected search result document, where the one or more computer devices further comprise:

means for boosting a score for the selected search result document to obtain a boosted score, and where the means for providing the list of search result documents further includes means for providing the selected search result document based on the boosted score for the selected search result document.

18. The system of claim 15, where the selected search result document is one of a plurality of search documents that have been saved as saved search results in a data structure; and where the one or more computer devices further comprise:

means for receiving a request to delete a first result of the saved search results from the data structure; and means for increasing a quality score associated with other results of the saved search results in response to deleting the first result.

19. The system of claim 15, where one or more advertisements are associated with the selected search result document, and where the one or more computer devices further comprise:

means for receiving a request to save one of the advertisements;

means for saving the one of the advertisements in response to the request to save the one of the advertisements; and means for identifying the received search query as commercial in nature based on saving the one of the advertisements.

20. The system of claim 19, where the one or more computer devices further comprise:

means for providing links to product reviews or to commercial documents or sites that are related to the one of the advertisements when the received search query is identified as commercial in nature.

21. The system of claim 19, where the one or more computer devices further comprise:

means for adjusting quality scores associated with the product reviews, or the commercial documents or sites, that are related to the one of the advertisements when the received search query is identified as commercial in nature.

22. The system of claim 15, where the means for identifying that the particular search result document is similar to the selected search result document, includes:
- means for determining that the search result document and the selected search result document are located on a same web site,
- means for determining that the search result document and the selected search result document have a same ratio of images to text,
- means for determining that a majority of words, in the search result document and the selected search result document, match,
- means for determining that a majority of uncommon words, in the search result document and the selected search result document, match,
- means for determining that the search result document and the selected search result document have a plurality of outgoing links pointing to the same documents,
- means for determining that the search result document and the selected search result document have a plurality of incoming links coming from the same documents,
- means for determining that the search result document and the selected search result document have same metadata tags,
- means for determining that the search result document and the selected search result document have a same format, and
- means for determining that the search result document and the selected search result document have a same layout.

23. A computer-readable memory device that stores computer-executable instructions, the computer-readable memory device comprising:
- one or more instructions to search a collection of documents, based on a search query, to identify a set of search result documents;
- one or more instructions to receive a request to save a selected search result document of the plurality of search result documents;
- one or more instructions to save information associated with the selected search result document in response to the request to save the selected search result document;
- one or more instructions to identify a particular document that is similar to the selected search result document based on the saved information and, where the one or more instructions to identify the particular document that is similar to the selected search result document includes at least two of:
  - one or more instructions to determine whether the particular document and the selected search result document have a plurality of outgoing links that point to the same documents,
  - one or more instructions to determine whether the particular document and the selected search result document have a plurality of incoming links that come from the same documents,
  - one or more instructions to determine whether the particular document and the selected search result document have a same format, or
  - one or more instructions to determine whether the particular document and the selected search result document have a same layout; and
- one or more instructions to boost, based on saving the information associated with the selected search result document and identifying the particular document as similar to the selected search result document, a score for the selected search result document and a score for the particular document for subsequent searches involving the search query.

24. The computer-readable memory device of claim 23, further comprising:
- one or more instructions to receive another search query;
- one or more instructions to determine a second set of search result documents based on the other search query, where the second set of search result documents includes the selected search result document and the particular document;
- one or more instructions to rank the selected search result document and the particular document within the second set of search result documents based on the respective boosted scores for the selected search result and the particular document; and
- one or more instructions to present the second set of search result documents, including the ranked selected search result document and the ranked particular document.

25. The computer-readable memory device of claim 23, where the selected search result document is one of a plurality of search result documents that have been saved as saved search results in a data structure, and
where the computer-readable memory device further comprises:
- one or more instructions to receive an indication to delete one of the saved search results;
- one or more instructions to delete the one of the saved search results in response to the received indication; and
- one or more instructions to adjust scores for a remaining one or more of the saved search results other than the deleted one of the saved search results.

26. The computer-readable memory device of claim 23, where the selected search result document is one of a plurality of search result documents that have been saved as saved search results in a data structure, and
where the computer-readable memory device further comprises:
- one or more instructions to receive an indication, from a user, that the user has e-mailed one or more of the saved search results to another user; and
- one or more instructions to adjust scores associated with the e-mailed one or more of the saved search results in response to the received indication.

27. The computer-readable memory device of claim 23, where the selected search result document is one of a plurality of search result documents that have been saved as saved search results in a data structure, and
where the computer-readable memory device further comprises:
- one or more instructions to receive an indication, from a user, to share one or more of the saved search results with another user;
- one or more instructions to provide the one or more saved search results to the other user in response to received indication; and
- one or more instructions to adjust scores associated with the provided one or more saved search results in response to providing the one or more saved search results to the other user.

28. The computer-readable memory device of claim 23, where the selected search result document is one of a plurality of search result documents that have been saved as saved search results in a data structure, and
where the computer-readable memory device further comprises:

one or more instructions to receive an indication to save a plurality of the saved search results together as a group;

one or more instructions to save, in response to the received indication, the plurality of the saved search results together as a group of saved search results; and one or more instructions to adjust scores associated with the plurality of the saved search results in the group of saved search results in response to saving the plurality of the saved search results together as the group.

29. The computer-readable memory device of claim 28, further comprising:

one or more instructions to receive a label that labels the group of saved search results; and one or more instructions to associate the label with the group of saved search results.

30. The computer-readable memory device of claim 23, where the one or more instructions to identify that the particular document is similar to the selected search result document, includes:

one or more instructions to determine that the particular document and the selected search result document are located on a same web site, one or more instructions to determine that the particular document and the selected search result document have a same ratio of images to text, one or more instructions to determine that a majority of words, in the particular document and the selected search result document, match, one or more instructions to determine that a majority of uncommon words, in the particular document and the selected search result document, match, one or more instructions to determine that the particular document and the selected search result document have a plurality of outgoing links pointing to the same documents, one or more instructions to determine that the particular document and the selected search result document have a plurality of incoming links coming from the same documents, one or more instructions to determine that the particular document and the selected search result document have same meta-data tags, one or more instructions to determine that the particular document and the selected search result document have a same format, and one or more instructions to determine that the particular document and the selected search result document have a same layout.

\* \* \* \* \*